US012525968B2

(12) United States Patent
Inoue et al.

(10) Patent No.: US 12,525,968 B2
(45) Date of Patent: Jan. 13, 2026

(54) MODULE CIRCUIT AND RESERVOIR CIRCUIT

(71) Applicant: NATIONAL INSTITUTE OF ADVANCED INDUSTRIAL SCIENCE AND TECHNOLOGY, Tokyo (JP)

(72) Inventors: Hisashi Inoue, Tsukuba (JP); Takeaki Yajima, Fukuoka (JP); Tetsuya Iizuka, Tokyo (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 0 days.

(21) Appl. No.: 18/715,699

(22) PCT Filed: Dec. 5, 2022

(86) PCT No.: PCT/JP2022/044655
§ 371 (c)(1),
(2) Date: May 31, 2024

(87) PCT Pub. No.: WO2023/106249
PCT Pub. Date: Jun. 15, 2023

(65) Prior Publication Data
US 2025/0030412 A1 Jan. 23, 2025

(30) Foreign Application Priority Data
Dec. 7, 2021 (JP) ................. 2021-198579

(51) Int. Cl.
*H03K 3/017* (2006.01)
*G06N 3/049* (2023.01)
(Continued)

(52) U.S. Cl.
CPC ............... *H03K 7/08* (2013.01); *G06N 3/049* (2013.01); *G06N 3/063* (2013.01); *H03K 3/017* (2013.01); *H03K 3/03* (2013.01); *H03K 3/0315* (2013.01)

(58) Field of Classification Search
CPC ............ G06G 7/60; G06N 3/04; G06N 3/049; G06N 3/063; H03K 3/017; H03K 3/0315; H03K 3/0322; H03K 5/04; H03K 7/08
See application file for complete search history.

(56) References Cited

U.S. PATENT DOCUMENTS

| 4,956,720 | A | * | 9/1990 | Tomisawa | ................ H03K 7/08 360/26 |
| 10,396,807 | B1 | * | 8/2019 | Dai | ........................... H03L 7/07 |

(Continued)

FOREIGN PATENT DOCUMENTS

JP 2005-267105 A 9/2005

OTHER PUBLICATIONS

International Search Report mailed Feb. 21, 2023 in corresponding PCT International Application No. PCT/JP2022/044655.
(Continued)

*Primary Examiner* — Levi Gannon
(74) *Attorney, Agent, or Firm* — OSTROLENK FABER LLP

(57) ABSTRACT

A module circuit includes a first block circuit, and a second block circuit, wherein the first block circuit includes a first input terminal into which an input pulse signal is input, a
(Continued)

holding unit that holds an average value of the input pulse signal for a predetermined period according to an interval of the input pulse signal and a width of the input pulse signal, an oscillation unit that generates an output pulse signal at a frequency according to the average value, and a first output terminal that outputs the output pulse signal, and the second block circuit includes a second input terminal to which the output pulse signal output from the first block circuit is input, a duty ratio adjuster that adjusts the duty ratio of the output pulse signal, and a second output terminal that outputs the output pulse signal adjusted by the duty ratio adjuster.

7 Claims, 16 Drawing Sheets

(51) Int. Cl.
    *G06N 3/063*     (2023.01)
    *H03K 3/03*     (2006.01)
    *H03K 7/08*     (2006.01)

(56) References Cited

U.S. PATENT DOCUMENTS

| | | | |
|---|---|---|---|
| 2004/0108913 A1* | 6/2004 | Pearce | H03L 7/0805 332/109 |
| 2006/0227861 A1* | 10/2006 | Maksimovic | H03K 5/133 375/238 |
| 2007/0208678 A1 | 9/2007 | Matsugu | |
| 2018/0191356 A1* | 7/2018 | Kesarwani | H03L 7/099 |
| 2018/0211165 A1 | 7/2018 | Oh et al. | |

OTHER PUBLICATIONS

X. Wu et al., A CMOS Spiking Neuron for Brain-Inspired Neural Networks with Resistive Synapses and In-Situ Learning, IEEE Transactions on Circuits and Systems II: Express Briefs, vol. 62, No. 11, p. 1088-1092, 2015.

Hanaa Mohsin Al-abboody et al., Review Paper: Background and Evolution of Spiking Neural Networks, IAETSD Journal for Advanced Research in Applied Sciences, [retrieval date Feb. 13, 2023], [online], Jul. 2021.

* cited by examiner

MODULE CIRCUIT AND RESERVOIR CIRCUIT

TECHNICAL FIELD

The present invention relates to a module circuit and a reservoir circuit.

Priority is claimed on Japanese Patent Application No. 2021-198579, filed Dec. 7, 2021, the content of which is incorporated herein by reference.

BACKGROUND ART

A leaky integration and fire (LIF) element using an analog method (an integration circuit) is known (Patent Document 1).

CITATION LIST

Non-Patent Document

[Non-Patent Document 1]
"IEEE Transactions on Circuits and Systems II: Express Briefs," Jul. 14, 2015, Vol. 62, No. 11, p. 1088-1092

SUMMARY OF INVENTION

Technical Problem

However, the LIF element using the analog method as described in Patent Document 1 tends to have high power consumption. There is a demand for low power consumption in the LIF element.

The present invention has been made in view of the above points, and provides a module circuit and a reservoir circuit that can realize low power consumption in a LIF element.

Solution to Problem

The present invention has been made to solve the above problems, and one aspect of the present invention is a module circuit including a first block circuit, and a second block circuit, wherein the first block circuit includes a first input terminal into which an input pulse signal is input, a holding unit that holds an average value of the input pulse signal for a predetermined period according to an interval of the input pulse signal and a width of the input pulse signal, an oscillation unit that generates an output pulse signal at a frequency according to the average value, and a first output terminal that outputs the output pulse signal, and the second block circuit includes a second input terminal to which the output pulse signal output from the first block circuit is input, a duty ratio adjuster that adjusts the duty ratio of the output pulse signal, and a second output terminal that outputs the output pulse signal adjusted by the duty ratio adjuster.

Further, according to one aspect of the present invention, in the module circuit, in the first block circuit, the holding unit may include a capacitor, integrate a pulse voltage indicating the input pulse signal, and hold a result of integrating the pulse voltage as the average value, the oscillation unit may be supplied with an integrated current, which is obtained by integrating the pulse voltage with the holding unit and increases monotonically with respect to the result of integrating the pulse voltage, from the holding unit, and may generate the output pulse signal with a frequency that depends on a magnitude of the integrated current, and a high side switching element that forms the pulse voltage charged to the capacitor by opening and closing according to the input pulse signal indicating an excitatory input may be further included.

Further, according to one aspect of the present invention, in the module circuit, the first block circuit may further include a low side switching element that discharges charge of the capacitor by opening and closing according to the input pulse signal indicating an inhibitory input.

Further, according to one aspect of the present invention, in the module circuit, the first block circuit may further include an inflow limiter that limits inflow of the integrated current from the holding unit to the oscillation unit.

Further, in the module circuit, one aspect of the present invention may further include a third block circuit, the third block circuit may include a third input terminal to which the output pulse signal output from the second block circuit is input, a charging unit charged by a leakage current of a MOS transistor, a pulse signal generation unit that generates a pulse signal and resets an amount of charging of the charging unit when the amount of charging of the charging unit exceeds a threshold value, and a third output terminal that outputs the pulse signal generated by the pulse signal generation unit, and a frequency with which the pulse signal generation unit generates the output pulse signal may increase or decrease according to frequency with which the output pulse signal is input to the third input terminal.

Further, according to one aspect of the present invention, in the module circuit, the third block circuit may include a CMOS inverter including a P-type MOS transistor and an N-type MOS transistor connected in series between a power supply terminal and a ground terminal, a reverser that generates an inverted signal by inverting the output from the CMOS inverter, a switching element that is disposed between the P-type MOS transistor and the N-type MOS transistor and opens and closes according to the inverted signal, a delay circuit that delays an output from the CMOS inverter and inputs the delayed output to the CMOS inverter again, a second capacitor charged by a pulse voltage indicating the output pulse signal input to the third input terminal, and at least one of a second low side switching element that discharges charges of the second capacitor in a closed state by opening and closing according to a second input pulse signal indicating an inhibitory input, and a second high side switching element that generates a pulse voltage indicating a first input pulse signal by opening and closing according to a first input pulse signal indicating an excitatory input, the charging unit may include the second capacitor, the pulse signal generation unit may include the reverser, the switching element, and the delay circuit, and a voltage of the second capacitor may be input to the CMOS inverter.

Further, one aspect of the present invention is a reservoir circuit including a plurality of module circuits.

Further, according to one aspect of the present invention, in the reservoir circuit, the second output terminal provided in each of the one or more module circuits and the first input terminal provided in one module circuit may be connected, or the second output terminal provided in one module circuit and the first input terminal provided in each of the one or more module circuits may be connected.

Advantageous Effects of Invention

According to the present invention, low power consumption can be realized in a LIF element.

DESCRIPTION OF EMBODIMENTS

Embodiments

Figure 1:
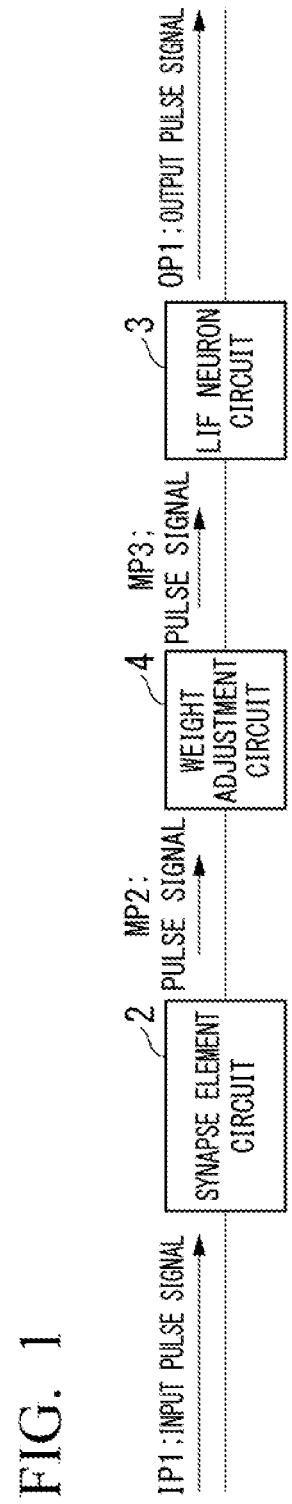
FIG. 1 is a diagram showing an example of a configuration of a module circuit according to an embodiment of the present invention.

Embodiments of the present invention will be described in detail below with reference to the drawings. FIG. 1 is a diagram showing an example of a configuration of a module circuit 1 according to an embodiment. The module circuit 1 includes a synapse element circuit 2, a weight adjustment circuit 4, and a LIF neuron circuit 3. The synapse element circuit 2, the weight adjustment circuit 4, and the LIF neuron circuit 3 are connected in series in this order and provided in the module circuit 1.

The module circuit 1 is used, for example, as a synapse of a neural network. An input pulse signal IP1 is input to the synapse element circuit 2. The input pulse signal IP1 is a pulse signal output from a synapse provided at the front stage of the module circuit 1. The synapse element circuit 2 integrates the input pulse signal IP1 and outputs a pulse signal MP2 as an output pulse signal with a frequency according to an integrated value. The synapse element circuit 2 is an example of a first block circuit.

The weight adjustment circuit 4 adjusts the pulse width of the pulse signal MP2 output from the module circuit 1. As the pulse width becomes wider, a charging and discharging speed of a neuron at a subsequent stage increases. That is, a wide pulse width corresponds to a large weight in the neural network. The weight adjustment circuit 4 outputs the pulse signal MP2 of which the pulse width has been adjusted as a pulse signal MP3. The pulse signal MP3 is output to the LIF neuron circuit 3. The weight adjustment circuit 4 is an example of a second block circuit.

The LIF neuron circuit 3 charges a node using a leakage current of a transistor. When a voltage of the node to be charged exceeds a threshold value, the LIF neuron circuit 3 outputs an output pulse signal OP1 and is reset. The output pulse signal OP1 is output to the neuron at a subsequent stage. In the LIF neuron circuit 3, the frequency at which the pulse signal is output increases or decreases according to the pulse signal MP3 input from the weight adjustment circuit 4. The LIF neuron circuit 3 is an example of a third block circuit.

The module circuit 1 is a leaky integration and fire (LIF) element that uses analog quantities (a pulse interval and a pulse width) in a time domain. In the module circuit 1, a LIF element with lower power consumption than a LIF element using a conventional analog method (an integration circuit) is realized by using the analog quantities in the time domain.

[Configuration of Synapse Element Circuit 2]

Figure 2:
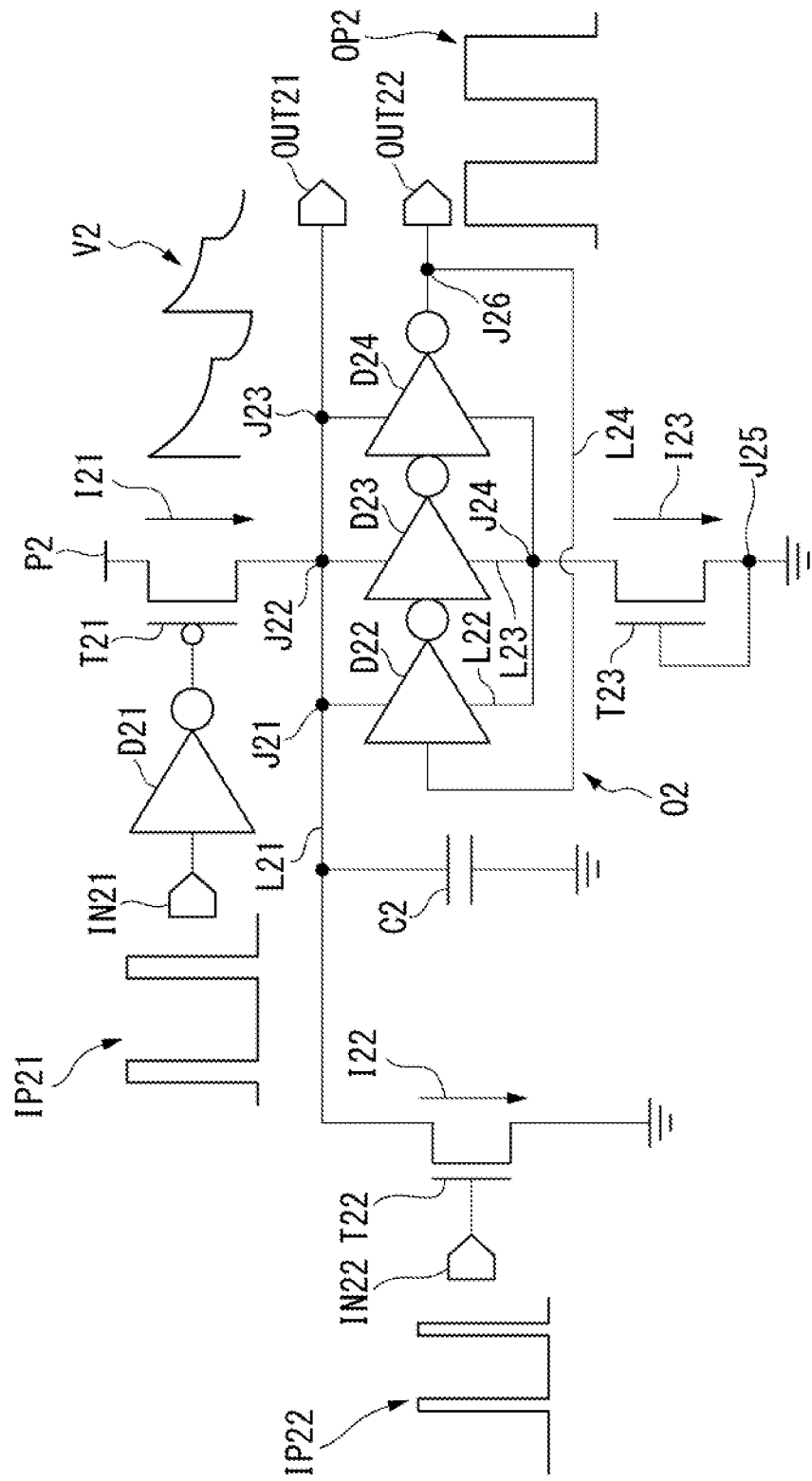
FIG. 2 is a diagram showing an example of a configuration of a synapse element circuit according to the embodiment of the present invention.

FIG. 2 is a diagram showing an example of a configuration of the synapse element circuit 2 according to this embodiment. The synapse element circuit 2 includes an input terminal IN21, an inverter D21, a P-type MOS transistor T21, a power supply terminal P2, an input terminal IN22, an N-type MOS transistor T22, a ring oscillator O2, a capacitor C2, an N-type MOS transistor T23, an output terminal OUT21, and an output terminal OUT22. The P-type MOS transistor T21, the N-type MOS transistor T22, and the N-type MOS transistor T23 are in an OFF state when no signal is input.

An input pulse signal IP21 is input to the input terminal IN21. As shown in FIG. 2, the input pulse signal IP21 is a rectangular wave that becomes high only for a short period of time in a predetermined cycle. The input pulse signal IP21 corresponds to the input pulse signal IP1 shown in FIG. 1. The input terminal IN21 is an example of a first input terminal.

The inverter D21 inverts a polarity of the input pulse signal IP21 input to the input terminal IN21. The input pulse signal IP21 of which the polarity has been inverted is a rectangular wave that becomes low only for a short period of time in a predetermined cycle.

The P-type MOS transistor T21 has a source connected to the power supply terminal P2, a gate connected to the inverter D21, and a drain connected to a connection point J22 of a wiring L21. The P-type MOS transistor T21 is turned on only while the input pulse signal IP21 of which the polarity is inverted by the inverter D21 becomes low, and a current I21 flows from the source to the drain. As described above, since the input pulse signal IP21 of which the polarity has been inverted is low for a short period of time, the P-type MOS transistor T21 is turned on for that short period of time.

The P-type MOS transistor T21 is an example of a high side switching element. The high side switching element opens and closes according to the input pulse signal IP21 indicating an excitatory input and thus forms a pulse voltage that is charged to the capacitor C2.

An input pulse signal IP22 is input to the input terminal IN22. As shown in FIG. 2, the input pulse signal IP22 is a rectangular wave that becomes high only for a short period of time in a predetermined cycle. As shown in FIG. 2, the pulse width of the input pulse signal IP22 is narrower than the pulse width of the input pulse signal IP21, for example. The input pulse signal IP22 corresponds to the input pulse signal IP1 shown in FIG. 1. The input terminal IN21 is an example of a first input terminal.

The N-type MOS transistor T22 has a source connected to a connection point J21 between the capacitor C2 and the wiring L21, a gate connected to the input terminal IN22, and a drain grounded. The N-type MOS transistor T22 is turned on only while the input pulse signal IP22 is high, and a current I22 flows from the source to the drain. As described above, since the input pulse signal IP22 is high only for a short period of time, the N-type MOS transistor T22 is turned on for that short period of time.

The N-type MOS transistor T22 is an example of a low side switching element. The low side switching element opens and closes according to the input pulse signal IP22 indicating an inhibitory input and thus discharges the charges of the capacitor C2.

The capacitor C2 is provided on the wiring L21. Every time the P-type MOS transistor T21 is turned on for a short period of time and the current I21 flows, it is charged for that short period of time, and charges are accumulated in the capacitor C2. A capacitance of the capacitor C2 is, for example, 150 fF (femtofarad). The other end of the capacitor C2 is grounded.

The capacitor C2 is an example of a holding unit. The holding unit holds an average value of the input pulse signal IP21 for a predetermined period according to an interval of the input pulse signal IP21 and a width of the input pulse signal IP21. The holding unit includes the capacitor C2, integrates a pulse voltage representing the input pulse signal IP21, and holds a result of integrating the pulse voltage as the average value.

The ring oscillator O2 is an oscillation circuit (an oscillator) that outputs a pulse signal. The ring oscillator O2 includes three inverters including an inverter D22, an inverter D23, and an inverter D24. The inverter D22 is connected to the wiring L21 through the connection point J21. The inverter D23 is connected to the wiring L21 through the connection point J22. The inverter D24 is connected to the wiring L21 through a connection point J23. The inverter D22, the inverter D23, and the inverter D24 are connected in series in this order. The inverter D24 is connected in series to the inverter D22 by a wiring L24 via a connection point J26. That is, the ring oscillator O2 has a ring-shaped structure.

The ring oscillator O2 is an example of an oscillation unit. The oscillation unit generates an output pulse signal OP2 at a frequency according to the average value of the input pulse signal IP21 held by the holding unit. The oscillation unit is supplied with an integrated current obtained by integrating the pulse voltage by the holding unit from the holding unit, and generates the output pulse signal OP2 having a frequency depending on a magnitude of the integrated current. The integrated current is a current that monotonically increases with respect to a result of integrating the pulse voltage by the holding unit.

A signal output from the inverter D24 is branched into two at the connection point J26. One of the signals branched at the connection point J26 is output to the output terminal OUT22. The output terminal OUT22 outputs one of the branched signals as the output pulse signal OP2. The output pulse signal OP2 corresponds to the pulse signal MP2 shown in FIG. 1. The other one of the signals branched at the connection point J26 is input to the inverter D22 via the wiring L24.

When a low signal is input to the inverter D22, the polarity of the signal is inverted by the inverter D22, the inverter D23, and the inverter D24, and a high signal is output from the inverter D24. Similarly, when a high signal is input to the inverter D22, a low signal is output from the inverter D24. The signal output from the inverter D24 periodically repeats low and high levels. As a result, the inverter D24 outputs the output pulse signal OP2.

The pulse interval of the output pulse signal OP2 depends on a voltage V2 of the node. Here, the connection point J21, the connection point J22, and the connection point J23 are collectively referred to as the node. The voltage is determined by the voltage of the capacitor C2. Therefore, the pulse interval of the output pulse signal OP2 depends on the voltage of the capacitor C2. As the pulse interval of the input pulse signal IP21 becomes narrower, more pulses are input per unit time, and more charge is accumulated in the capacitor C2. As more charges are accumulated in the capacitor C2, the voltage of the capacitor C2 increases. As the voltage of the capacitor C2 becomes high, the pulse interval of the output pulse signal OP2 becomes narrow, and more pulses are output per unit time.

That is, in the synapse element circuit 2, the input pulse signal IP21 is integrated by the accumulation of charges in the capacitor C2, and the output pulse signal OP2 having a frequency (a pulse interval) corresponding to the integrated value is output. In other words, a waveform of the output pulse signal OP2 corresponds to a result of integrating the waveform of the input pulse signal IP21. The waveform of the output pulse signal OP2 is used for learning when the synapse element circuit 2 is used as a node of a neural network. The output pulse signal OP2 corresponds to the pulse signal MP2 shown in FIG. 1.

At the same time as outputting the output pulse signal OP2, the ring oscillator O2 consumes a current. The current consumed by the ring oscillator O2 is referred to as a leakage current I23. The leakage current I23 flows out from the connection point J24.

Here, the value of the voltage V2 at the node shown in FIG. 2 increases every time the P-type MOS transistor T21 is turned on, and decreases as the ring oscillator O2 operates and the leakage current I23 flows out. In the synapse element circuit 2, the output pulse signal OP2 is generated by the leakage current I23 flowing out according to the operation of the ring oscillator O2. That is, in the synapse element circuit 2, the leakage current is converted into a pulse train.

In the synapse element circuit 2 shown in FIG. 2, an amount of leakage current I23 is adjusted by the N-type MOS transistor T23. The N-type MOS transistor T23 has a source connected to the connection point J24, and a drain and a gate grounded via the connection point J25.

The N-type MOS transistor T23 is an example of an inflow limiter. The inflow limiter limits an inflow of the integrated current from the holding unit to the oscillation unit.

The N-type MOS transistor T23 may be omitted from the configuration of the synapse element circuit 2. In the case in which the N-type MOS transistor T23 is not provided, even if only an amount of current I21 flowing through the P-type MOS transistor T21 is adjusted, the amount of leakage current I23 flowing out from the ring oscillator O2 cannot be adjusted. Therefore, accuracy of adjustment for making the output pulse signal OP2 output from the ring oscillator O2 into a desired pulse train is higher when the N-type MOS transistor T23 is provided than when it is not provided.

Furthermore, the input terminal IN22 and the N-type MOS transistor T22 may be omitted from the configuration of the synapse element circuit 2.

[Configuration of Weight Adjustment Circuit 4]

Figure 3:
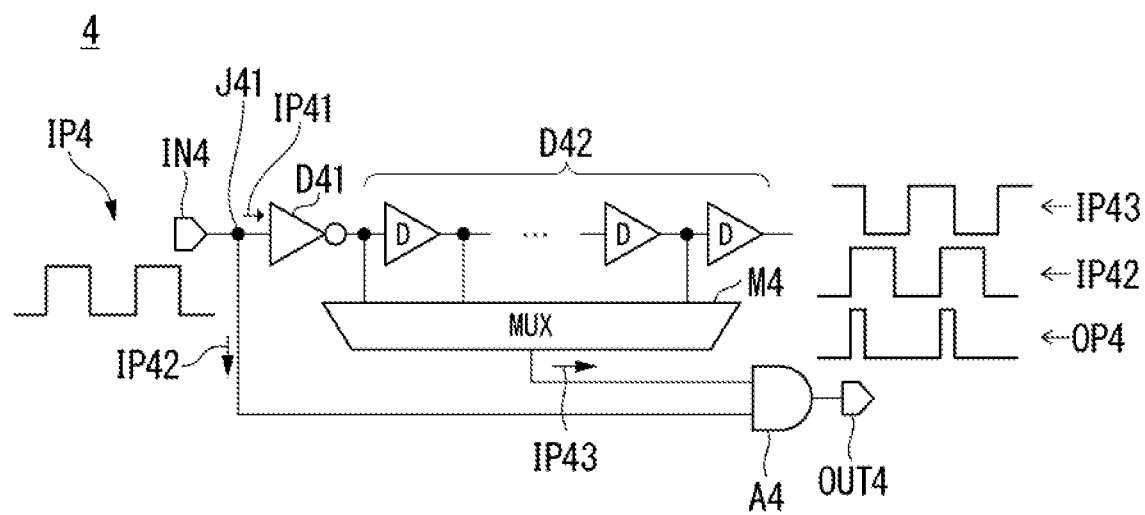
FIG. 3 is a diagram showing an example of a configuration of a weight adjustment circuit according to the embodiment of the present invention.

FIG. 3 is a diagram showing an example of a configuration of the weight adjustment circuit 4 according to this embodiment.

The weight adjustment circuit 4 includes an input terminal IN4, an inverter D41, a delay line D42, a multiplexer M4, a gate A4, and an output terminal OUT4.

An input pulse signal IP4 is input to the input terminal IN4. The input pulse signal IP4 corresponds to the pulse signal MP2 shown in FIG. 1 (in other words, the output pulse signal OP2 shown in FIG. 2). That is, the output pulse signal OP2 output from the first block circuit is input to the input terminal IN4.

The input pulse signal IP4 input to the input terminal IN4 is branched into a pulse signal IP41 and a pulse signal IP42 at a connection point J41. The pulse signal IP41 is input to the inverter D41. The pulse signal IP42 is input to the gate A4.

The inverter D41 inverts the polarity of the pulse signal IP41 and outputs it to the delay line D42.

The delay line D42 is configured of a plurality of delay elements connected in series. The multiplexer M4 selects one of the plurality of delay elements constituting the delay line D42 and outputs it as a pulse signal IP43. According to which delay element the signal is extracted from, the pulse signal IP43 is delayed compared to the pulse signal IP42. Among the plurality of delay elements connected in series in the delay line D42, as the delay element from which a signal is extracted becomes farther from the inverter D41 side, the extracted pulse signal IP43 is increasingly delayed compared with the pulse signal IP42.

The pulse signal IP42 and the pulse signal IP43 delayed from the pulse signal IP42 are input to the gate A4. The gate A4 outputs a signal corresponding to a logical product of the input pulse signal IP42 and the pulse signal IP43. The signal output from the gate A4 is output from the output terminal OUT4 as an output pulse signal OP4.

A pulse width of the output pulse signal OP4 is narrower than that of the input pulse signal IP4 according to which delay element in the delay line D42 the signal is extracted from. FIG. 3 shows the waveform of the pulse signal IP43, the waveform of the pulse signal IP42, and the waveform of the output pulse signal OP4.

Since the pulse signal IP42 is simply a branch of the input pulse signal IP4 at the connection point J41, the waveform of the pulse signal IP42 is the same as the waveform of the input pulse signal IP4. On the other hand, the pulse signal IP43 is delayed with respect to the pulse signal IP42. The output pulse signal OP4 having a narrower pulse width than the input pulse signal IP4 is obtained by combining the waveform of the pulse signal IP42 and the waveform of the pulse signal IP43 delayed with respect to the pulse signal IP42.

Therefore, in the weight adjustment circuit 4, the pulse width of the output pulse signal OP4 is adjusted according to which delay element in the delay line D42 the signal is extracted from.

The inverter D41, the delay line D42, and the multiplexer M4 are examples of a duty ratio adjuster. The duty ratio adjuster adjusts a duty ratio of the output pulse signal OP4. The output terminal OUT4 is an example of a second output terminal. The second output terminal outputs the output pulse signal OP4 adjusted by the duty ratio adjuster.

The configuration of the weight adjustment circuit 4 is not limited to the configuration shown in FIG. 3 as long as the duty ratio of the pulse can be adjusted. The weight adjustment circuit 4 may have other configurations, such as a configuration in which a load capacitance is made variable to adjust the pulse width.

[Configuration of LIF Neuron Circuit 3]

Figure 4:
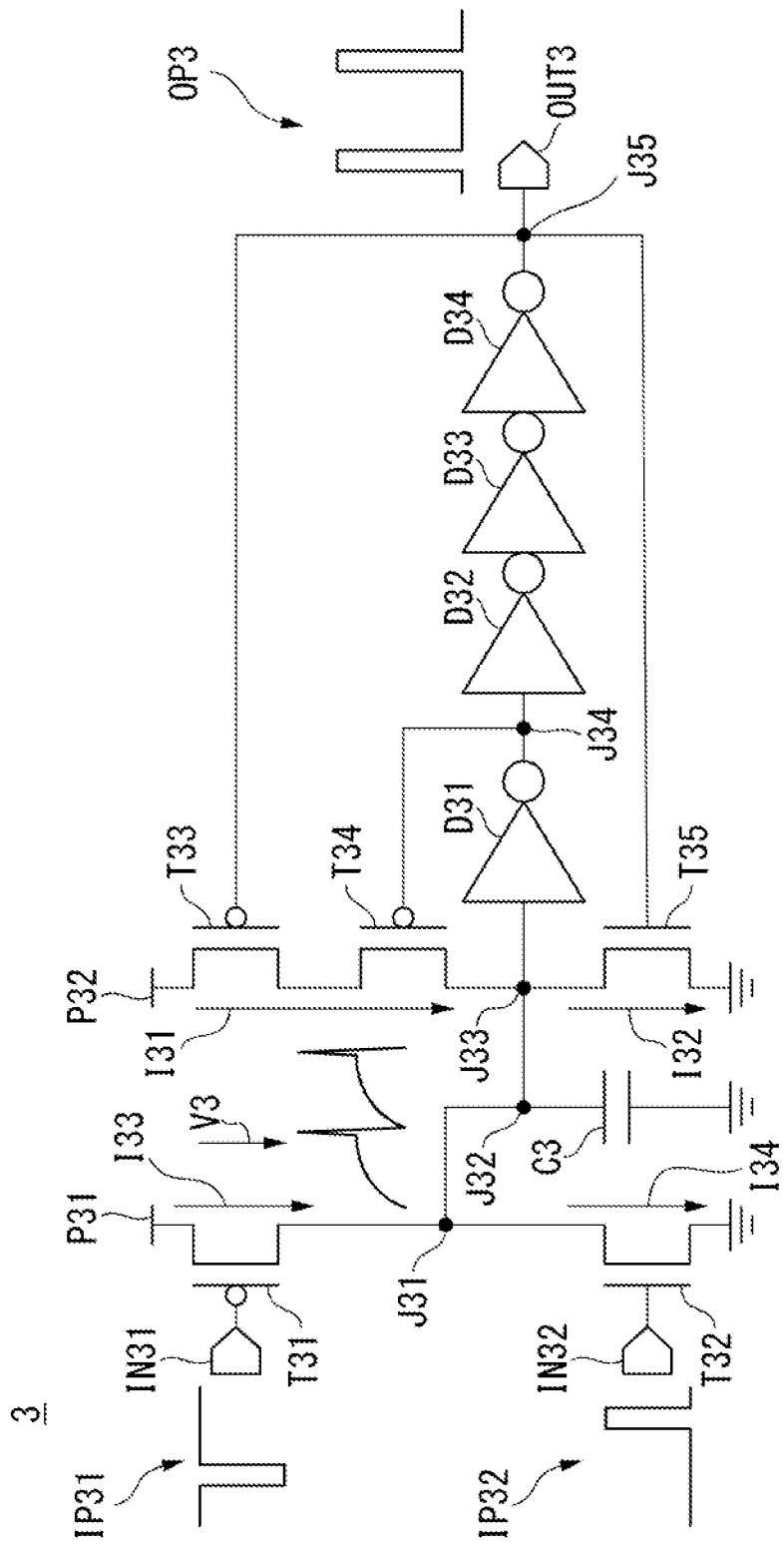
FIG. 4 is a diagram showing an example of a configuration of a LIF neuron circuit according to the embodiment of the present invention.

FIG. 4 is a diagram showing an example of a configuration of the LIF neuron circuit 3 according to this embodiment. The LIF neuron circuit 3 includes an input terminal IN31, a P-type MOS transistor T31, an input terminal IN32, an N-type MOS transistor T32, a power supply terminal P31, a capacitor C3, a power supply terminal P32, a P-type MOS transistor T33, a P-type MOS transistor T34, an N-type MOS transistor T35, an inverter D31, an inverter D32, an inverter D33, an inverter D34, and an output terminal OUT3.

The P-type MOS transistor T31, the N-type MOS transistor T32, the P-type MOS transistor T33, the P-type MOS transistor T34, and the N-type MOS transistor T35 are in an OFF state when no signal is input. Further, a parasitic capacitance of each of the P-type MOS transistor T31, the N-type MOS transistor T32, the P-type MOS transistor T33, the P-type MOS transistor T34, and the N-type MOS transistor T35 is, for example, 10 fF (femtofarad).

The P-type MOS transistor T33 has a source connected to the power supply terminal P32, a gate connected to the connection point J35, and a drain connected to a source of the P-type MOS transistor T34.

The P-type MOS transistor T34 has the source connected to the drain of the P-type MOS transistor T33, a gate connected to a connection point J34, and a drain connected to a connection point J33.

As described above, the P-type MOS transistor T33 and the P-type MOS transistor T34 are in the OFF state. A leakage current I31 flows through the P-type MOS transistor T33 and the P-type MOS transistor T34 even in the OFF state. The leakage current I31 always flows even in the OFF state.

The capacitor C3 is connected to the connection point J33 via the connection point J32. When the leakage current I31 flows through the P-type MOS transistor T33 and the P-type MOS transistor T34, charges are accumulated in the capacitor C3. Therefore, in the LIF neuron circuit 3, the capacitor C3 is charged by the leakage current I31 flowing through the P-type MOS transistor T33 and the P-type MOS transistor T34. That is, the capacitor C3 is charged by the leakage current I31 of the P-type MOS transistor T33 and the P-type MOS transistor T34 which are MOS transistors. The capacitor C3 is included in a charging unit.

As charges are accumulated in the capacitor C3, and the voltage of the capacitor C3 increases, a voltage V3 at the connection point J32 increases. That is, the voltage of the capacitor C3 is input to CMOS inverter (the P-type MOS transistor T33 and the N-type MOS transistor T35). When the voltage at the connection point J32 exceeds a threshold value of the inverter D31, the inverter D31 outputs a signal corresponding to the voltage V3 at the connection point J32 with its polarity inverted.

The inverter D32, the inverter D33, and the inverter D34 are provided in series in this order. The inverter D32 is connected to the connection point J34, and the inverter D34 is connected to the connection point J35. The signal output from inverter D31 is inverted by three inverters including the inverter D32, the inverter D33, and the inverter D34, and is then output from the inverter D34.

A pulse signal output from the inverter D34 is output from the output terminal OUT3 to the connection point J35 as an output pulse signal OP3. The output pulse signal OP3 corresponds to the output pulse signal OP1 shown in FIG. 1.

The N-type MOS transistor T35 has a source connected to the connection point J33, a gate connected to the connection point J35, and a drain grounded. When the output pulse signal OP3 output from the inverter D34 becomes high only for a short period of time, the N-type MOS transistor T35 is turned on for that short period of time. When the N-type MOS transistor T35 is turned on, the charges accumulated in the capacitor C3 flow out, and a current I32 flows in the N-type MOS transistor T35 from the source to the drain. The voltage of the capacitor C3 is reset by the current I32 flowing through the N-type MOS transistor T35.

Here, the connection point J31, the connection point J32, and the connection point J33 are collectively referred to as a node. Therefore, voltage V3 is a voltage at the node.

A value of the voltage V3 at the node shown in FIG. 4 increases as charges are accumulated due to the leakage current I31 of the P-type MOS transistor T33 and the P-type MOS transistor T34. A method in which the value of voltage V3 increases due to the leakage current I31 becomes a gradual increasing function which is upwardly convex, when the value is expressed as a function of time.

When the voltage V3 at the node exceeds the threshold value of the inverter D31 and the inverted signal is output from the inverter D31, the voltage V3 increases rapidly. The signal output from the inverter D31 is inverted by the three inverters including the inverter D32, the inverter D33, and the inverter D34 and is delayed by a required time, and then the N-type MOS transistor T35 is turned on. When the N-type MOS transistor T35 is turned on, the capacitor C3 is reset and the value of the voltage V3 rapidly decreases.

A peak is formed in temporal change of the voltage V3 by the sudden increase in the voltage V3 due to the above-described voltage V3 at the node exceeding the threshold value of the inverter D31 and the sudden decrease in the voltage V3 due to the reset of the capacitor C3. The time when the output pulse signal OP3 becomes high corresponds to the peak of the temporal change in the voltage V3 at the node.

As described above, the P-type MOS transistor T33 and the N-type MOS transistor T35 are connected in series between a power supply terminal and a ground terminal. The P-type MOS transistor T33 and the N-type MOS transistor T35 are provided as a CMOS inverter.

The inverter D31 generates an inverted signal by inverting an output from the CMOS inverter. The inverter D31 is an example of a reverser.

The P-type MOS transistor T34 is disposed between the P-type MOS transistor T33 and the N-type MOS transistor T35, and opens and closes according to the inverted signal generated by the inverter D31. The P-type MOS transistor T34 is an example of a switching element.

The inverter D32, the inverter D33, and the inverter D34 delay an output from the CMOS inverter (the P-type MOS transistor T33 and the N-type MOS transistor T35) and input the delayed output to the CMOS inverter again. The inverter D32, the inverter D33, and the inverter D34 are examples of delay circuits.

The inverter D31, the P-type MOS transistor T34, the inverter D32, the inverter D33, and the inverter D34 are included in a pulse signal generation unit. The pulse signal generation unit includes a reverser (the inverter D31), a switching element (the P-type MOS transistor T34), and a delay circuit (the inverter D32, the inverter D33, and the inverter D34). The pulse signal generation unit generates a pulse signal and resets an amount of charge of the charging unit when the amount of charge of the charging unit exceeds a threshold value.

Further, the output terminal OUT3 is an example of a third output terminal. The third output terminal outputs the output pulse signal OP3 generated by the pulse signal generation unit. The output pulse signal OP3 corresponds to the output pulse signal OP1 shown in FIG. 1, and is output to a neuron at a subsequent stage.

The P-type MOS transistor T31 and the N-type MOS transistor T32 adjust the pulse interval of the output pulse signal OP3. The adjustment of the pulse interval of the output pulse signal OP3 by the P-type MOS transistor T31 and the N-type MOS transistor T32 will be described below.

An input pulse signal IP31 is input to the input terminal IN31. As shown in FIG. 4, the input pulse signal IP31 is a rectangular wave that becomes low only for a short period of time in a predetermined cycle. The input terminal IN31 is an example of a third input terminal to which the output pulse signal OP4 (in other words, the pulse signal MP3 shown in FIG. 1) output from the second block circuit (the weight adjustment circuit 4) is input.

The P-type MOS transistor T31 has a source connected to the power supply terminal P31, a gate connected to the input terminal IN31, and a drain connected to the connection point J31.

When the input pulse signal IP31 input to the gate of the P-type MOS transistor T31 becomes low for a short period of time, the P-type MOS transistor T31 is turned on for that short period of time. When the P-type MOS transistor T31 is turned on, a current I33 flows through the P-type MOS transistor T31 from the source to the drain.

As the current I33 flows through the P-type MOS transistor T31, charges are accumulated in the capacitor C3. As described above, charges are also accumulated in the capacitor C3 due to the leakage current I31 flowing through the P-type MOS transistor T33 and the P-type MOS transistor T34. Therefore, when the P-type MOS transistor T31 is turned on, more charges are accumulated in the capacitor C3 than when the P-type MOS transistor T31 is turned off.

An input pulse signal IP32 is input to the input terminal IN32. As shown in FIG. 4, the input pulse signal IP32 is a rectangular wave that becomes high only for a short period of time in a predetermined cycle. The input terminal IN32 is an example of a third input terminal to which the output pulse signal OP1 output from the second block circuit (the weight adjustment circuit 4) is input.

The N-type MOS transistor T32 has a source connected to the connection point J31, a gate connected to the input terminal IN32, and a drain grounded.

When the input pulse signal IP32 input to the gate of the N-type MOS transistor T32 becomes high for a short period of time, the N-type MOS transistor T32 is turned on for that short period of time. When the N-type MOS transistor T32 is turned on, a current I34 flows through the N-type MOS transistor T32 from the source to the drain. When the current I34 flows through the N-type MOS transistor T32, the charges flow out from the capacitor C3. Therefore, when the N-type MOS transistor T32 is turned on, less charges are accumulated in the capacitor C3 than when the N-type MOS transistor T32 is turned off.

As described above, the N-type MOS transistor T32 discharges the charges of the input pulse signal IP32 in a closed state by opening and closing according to the input pulse signal IP32 indicating the inhibitory input. The N-type MOS transistor T32 is an example of a second low side switching element. The input pulse signal IP32 is an example of a second input pulse signal.

Furthermore, the P-type MOS transistor T31 generates a pulse voltage indicating the input pulse signal IP31 by opening and closing according to the input pulse signal IP31 indicating the excitatory input. The P-type MOS transistor T31 is an example of a second high side switching element. The input pulse signal IP31 is an example of a first input pulse signal.

As described above, the charges accumulated in the capacitor C3 increases or decreases due to an input of a pulse signal to the P-type MOS transistor T31 or the N-type MOS transistor T32. When the charges accumulated in the capacitor C3 increases or decreases, the voltage V3 at the node changes. Further, the output pulse signal OP3 output from the output terminal OUT3 becomes high when the voltage V3 exceeds the threshold value of the inverter D31. By changing the voltage V3 at the node due to the input of the pulse signal to the P-type MOS transistor T31 or the N-type MOS transistor T32, it is possible to adjust a timing at which the voltage V3 exceeds the threshold value of the inverter D31. The pulse interval of the output pulse signal OP3 is determined according to a timing at which the voltage V3 exceeds the threshold value of the inverter D31.

Therefore, in the LIF neuron circuit 3, the pulse interval of the output pulse signal OP3 can be adjusted by the input pulse signal IP31 or the input pulse signal IP32. In other words, in the LIF neuron circuit 3, the output frequency of the output pulse signal OP3 can be increased or decreased by the input pulse signal IP31 or the input pulse signal IP32. The input pulse signal IP31 corresponds to an excitatory pulse. The input pulse signal IP32 corresponds to an inhibitory pulse.

As described above, the capacitor C3 is charged by the pulse voltage indicating the input pulse signal (the input pulse signal IP31 or the input pulse signal IP32). The capacitor C3 is an example of a second capacitor charged by a pulse voltage indicating the output pulse signal OP4 (that is, the input pulse signal IP31 or the input pulse signal IP32) input to the third input terminal (the input terminal IN31 or the input terminal IN32).

Here, the input pulse signal IP31 or the input pulse signal IP32 is the output pulse signal OP4 output from the weight adjustment circuit 4 provided at the front stage of the LIF neuron circuit 3. For example, two weight adjustment circuits 4 are provided at the front stage of the LIF neuron circuit 3, and the input pulse signal IP31 is input from one weight adjustment circuit 4, and the input pulse signal IP32 is input from the other weight adjustment circuit 4. The synapse element circuit 2 is provided at the front stage of each of the weight adjustment circuits 4.

Therefore, the frequency at which the pulse signal generation unit generates the output pulse signal OP3 increases or decreases according to the frequency at which the output pulse signal OP4 output from the weight adjustment circuit 4 is input to the third input terminal (the input terminal IN31 or the input terminal IN32).

From the configuration of the LIF neuron circuit 3, either the P-type MOS transistor T31 or the N-type MOS transistor T32 may be omitted. For example, when the pulse interval is simply shortened by the LIF neuron circuit 3, it is sufficient to include the P-type MOS transistor T31. On the other hand, when the pulse interval is simply lengthened by the LIF neuron circuit 3, it is sufficient to include the N-type MOS transistor T32.

The pulse interval of the output pulse signal OP3 also depends on sizes of the transistors (the P-type MOS transistor T31, the N-type MOS transistor T32, the P-type MOS transistor T33, the P-type MOS transistor T34, and the N-type MOS transistor T35) provided in the LIF neuron circuit 3. Therefore, the pulse interval of the output pulse signal OP3 output from the LIF neuron circuit 3 can be adjusted by adjusting the sizes of the transistors included in the LIF neuron circuit 3. However, since the sizes of the transistors are determined at the time when the LIF neuron circuit 3 is assembled, the adjustment of the pulse interval based on the sizes of the transistors is an adjustment that is made at the time when the LIF neuron circuit 3 is assembled.

A magnitude of the leakage current I31 is very small compared to a magnitude of the current I33 flowing through the P-type MOS transistor T31 or a magnitude of the current I34 flowing through the N-type MOS transistor T32.

Further, the leakage current also flows through the P-type MOS transistor T31 and the N-type MOS transistor T32 even in the OFF state. The charges accumulated in the capacitor C3 also increase or decrease according to the leakage current flowing through each of the P-type MOS transistor T31 and the N-type MOS transistor T32. Charges are accumulated in the capacitor C3 due to the leakage current flowing through the P-type MOS transistor T31. The charges flow out from the capacitor C3 due to the leakage current flowing through the N-type MOS transistor T32.

In the module circuit 1, since the LIF neuron circuit 3 is included, a relationship between the pulse interval of the input pulse signal (the input pulse signal IP1 shown in FIG. 1) and the pulse interval of the output pulse signal (the output pulse signal OP1 shown in FIG. 1) becomes a nonlinear relationship.

The LIF neuron circuit 3 may be omitted from the configuration of the module circuit 1. In that case, the output pulse signal OP2 output from the synapse element circuit 2 is directly input to the input terminal IN4 which is the second input terminal.

Further, as described above, the configuration of the low side switching element may be omitted from the configuration of the synapse element circuit 2. In this embodiment, since the synapse element circuit 2 includes a low side switching element, the input pulse signal IP22 indicating the inhibitory input can be input to the synapse element circuit 2. Therefore, in the synapse element circuit 2 having the configuration of a low side switching element, even when the LIF neuron circuit 3 is omitted from the configuration of the module circuit 1, as the frequency and width of the pulses input to the synapse element circuit 2 increases, the frequency of the pulse output becomes small.

As a result, even when the LIF neuron circuit 3 is omitted from the configuration of the module circuit 1, as will be described below, when the module circuit 1 is applied to a neural network, an operation of the neural network can be stabilized. In this embodiment, a function of stabilizing the operation of the neural network is carried out by the LIF neuron circuit 3.

[Application to Reservoir Circuit and Spiking Neural Network]

Next, with reference to FIGS. 5 to 11, an example of application of the module circuit 1, which is the LIF element, to a reservoir circuit and a spiking neural network (NN) will be described.

Figure 5:
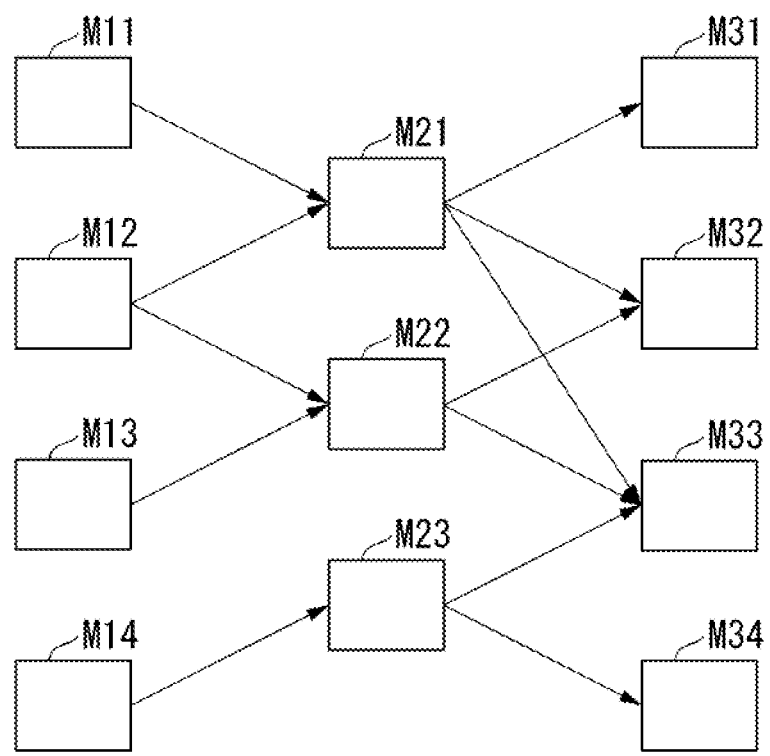
FIG. 5 is a diagram showing an example of a configuration of a reservoir circuit according to the embodiment of the present invention.

FIG. 5 is a diagram showing an example of a configuration of the reservoir circuit N1 according to this embodiment. As an example, the reservoir circuit N1 includes three layers including an input layer, an intermediate layer, and an output layer. The input layer includes a LIF element M11, a LIF element M12, a LIF element M13, and a LIF element M14. The intermediate layer includes a LIF element M21, a LIF element M22, and a LIF element M23. The output layer includes a LIF element M31, a LIF element M32, a LIF element M33, and a LIF element M34. Each of the LIF elements (the LIF element M11, LIF element M12, ..., LIF element M34) has the same configuration as the module circuit 1 shown in FIG. 1. In other words, the reservoir circuit N1 is a reservoir circuit including a plurality of module circuits 1.

Here, for example, attention will be paid to the LIF element M11 and the LIF element M12 provided in the input layer, and the LIF element M21 provided in the intermediate layer. The output terminal OUT3 (FIG. 4) provided in the LIF element M11 and the input terminal IN21 or the input terminal IN22 (FIG. 2) provided in the LIF element M21 are connected. The output terminal OUT3 (FIG. 4) provided in the LIF element M12 and the input terminal IN21 or the input terminal IN22 (FIG. 2) provided in the LIF element M21 are connected. As a result, the output pulse signal OP3 output from each of the LIF element M11 and the LIF element M12 is input to the LIF element M21 as the input pulse signal IP21 or the input pulse signal IP22.

Therefore, the output terminal OUT3 provided in each of the one or more module circuits 1 and the input terminal IN21 or the input terminal IN22 provided in one module circuit 1 are connected.

On the other hand, for example, attention will be paid to the LIF element M12 provided in the input layer, and the LIF element M21 and the LIF element M22 provided in the intermediate layer. The output terminal OUT3 (FIG. 4) provided in the LIF element M12 and the input terminal IN21 or the input terminal IN22 (FIG. 2) provided in the LIF element M21 are connected. The output terminal OUT3 (FIG. 4) provided in the LIF element M12 and the input terminal IN21 or the input terminal IN22 (FIG. 2) provided in the LIF element M22 are connected. As a result, the output pulse signal OP3 output from the LIF element M12 is input as the input pulse signal IP21 or the input pulse signal IP22 to each of the LIF element M21 and the LIF element M22.

Therefore, the output terminal OUT3 provided in one module circuit 1 and the input terminal IN21 or the input terminal IN22 provided in each of the one or more module circuits 1 are connected.

Figure 6:
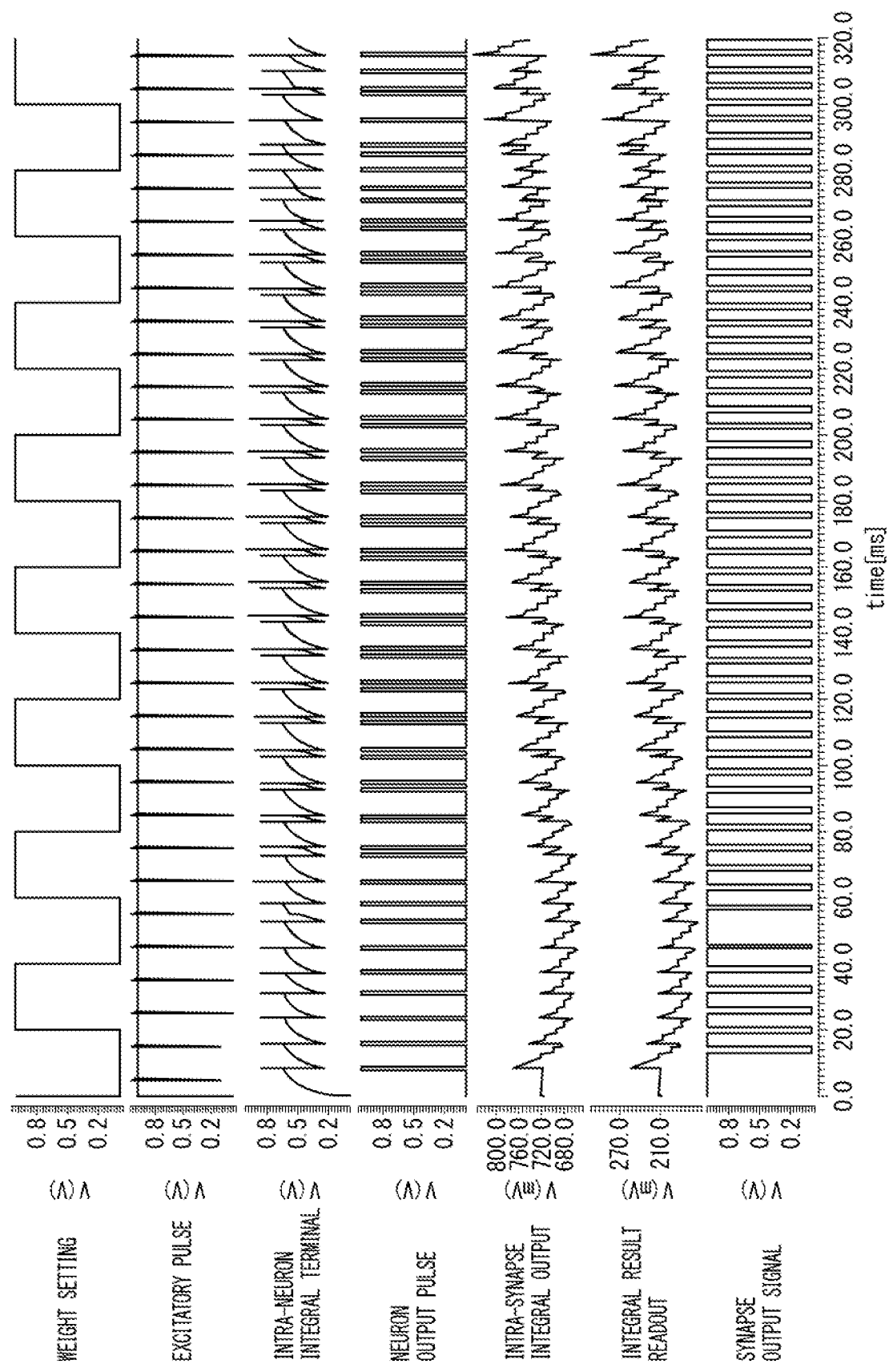
FIG. 6 is a diagram showing an example of an operation confirmation result when one synapse element circuit, one weight adjustment circuit, and one LIF neuron circuit according to the embodiment of the present invention are connected.

Next, a description of results of an operation confirmation in a case in which one synapse element circuit 2, one weight adjustment circuit 4, and one LIF neuron circuit 3 are connected in this order will be given. FIG. 6 is a diagram showing an example of an operation confirmation result when one synapse element circuit, one weight adjustment circuit, and one LIF neuron circuit according to this embodiment are connected. A plurality of graphs shown in FIG. 6 show temporal change in values of weight settings, excitatory pulses, intra-neuron integral terminals, neuron output pulses, intra-synapse integral outputs, integral result readouts, and synapse output signals. In the operation confirmation results shown in FIG. 6, only the excitatory pulses are input to the LIF neuron circuit 3, and no inhibitory pulses are input.

The weight setting indicates data for setting a duty ratio of the weight adjustment circuit 4. In other words, it indicates a value of a signal that instructs the multiplexer M4 (FIG. 3) included in the weight adjustment circuit 4 which one of the plurality of delay elements constituting the delay line D42 should be selected as a delay element from which the pulse signal is extracted.

The excitatory pulse indicates the value of the input pulse signal IP4 input to the input terminal IN4 provided in the weight adjustment circuit 4. The excitatory pulse is a pulse signal generated with a constant period, amplitude, and duty ratio.

The intra-neuron integral terminal indicates the value of the voltage V3 at the node (the connection point J31, the connection point J32, and the connection point J33) provided in the LIF neuron circuit 3. The value of the voltage V3 at the node is equal to the value of the voltage of the capacitor C3, as described above.

The neuron output pulse indicates the value of the output pulse signal OP3 output from the output terminal OUT3 provided in the LIF neuron circuit 3.

The intra-synapse integral output indicates the value of the voltage V2 at the node (the connection point J21, the connection point J22, and the connection point J23) provided in the synapse element circuit 2. The value of the voltage V2 at the node is equal to the value of the voltage of the capacitor C2, as described above.

The integral result readout indicates a value of a signal output from the output terminal OUT21 provided in the synapse element circuit 2.

The synapse output signal indicates the value of the output pulse signal OP2 output from the output terminal OUT22 provided in the synapse element circuit 2.

From the temporal change in the intra-synapse integral output and the integral result readout, it can be seen that the synapse element circuit 2 functions as a LIF element.

According to the operation confirmation result shown in FIG. 6, the average power consumption in the LIF neuron circuit 3 was 2.5 nW (nanowatts). The average power consumption in the synapse element circuit 2 was 3.0 nW.

Figure 7:
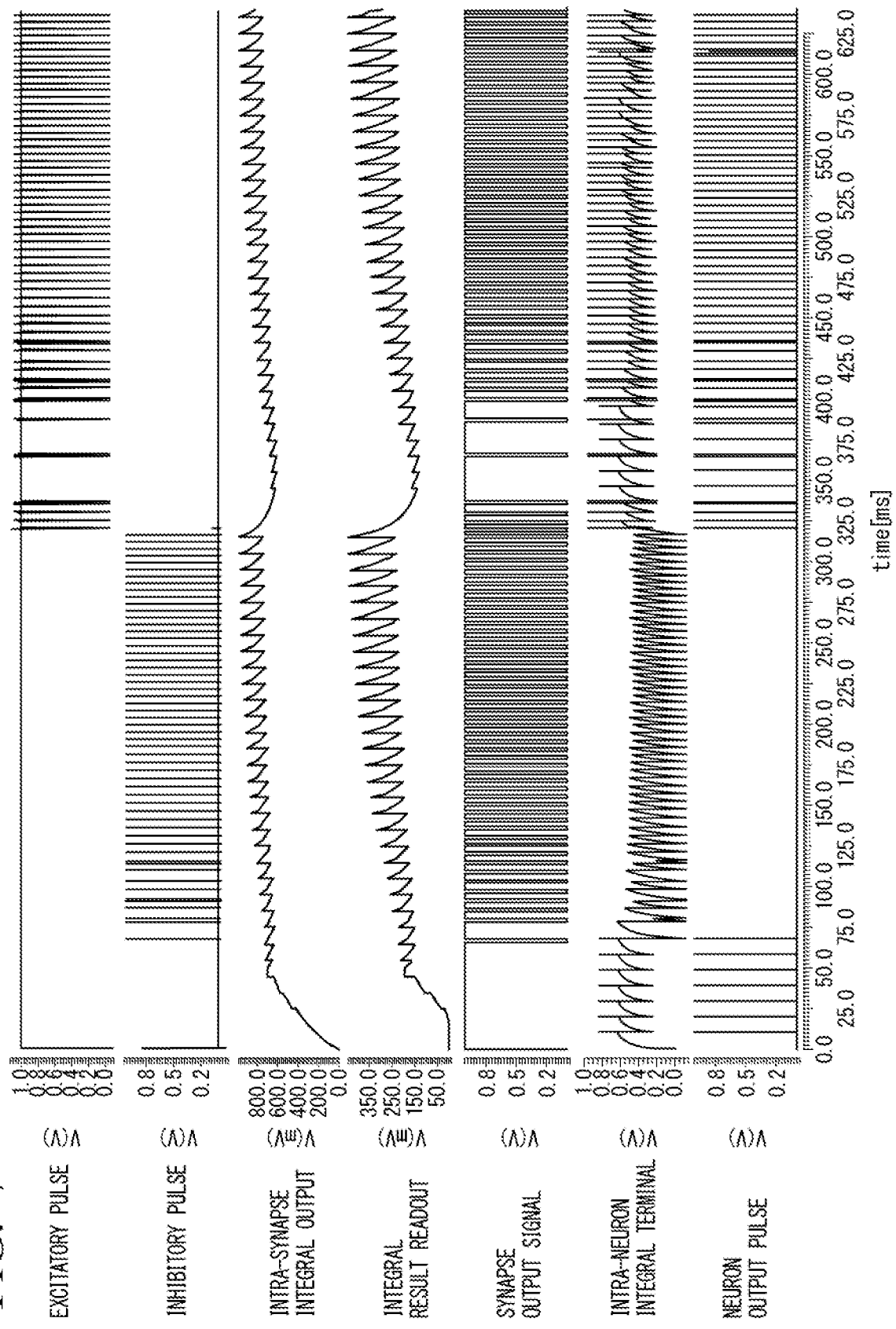
FIG. 7 is a diagram showing an example of an operation confirmation result when one synapse element circuit, one weight adjustment circuit, and one LIF neuron circuit according to the embodiment of the present invention are connected.

FIG. 7 is a diagram showing an example of the operation confirmation result when one synapse element circuit, one weight adjustment circuit, and one LIF neuron circuit according to this embodiment are connected. A plurality of graphs shown in FIG. 7 show the temporal change in each of the values of the excitatory pulse, the inhibitory pulse, the intra-synapse integral output, the integral result readout, the synapse output signal, the intra-neuron integral terminal, and the neuron output pulse. In the operation confirmation result shown in FIG. 7, the excitatory pulse and the inhibitory pulse are input to the LIF neuron circuit 3.

The excitatory pulse indicates the value of the input pulse signal IP31 input to the input terminal IN4 provided in the weight adjustment circuit 4. The excitatory pulse is a pulse signal generated with a constant period, amplitude, and duty ratio.

The inhibitory pulse indicates the value of the input pulse signal IP32 input to the input terminal IN32 provided in the weight adjustment circuit 4. The inhibitory pulse is a pulse signal generated with a constant period, amplitude, and duty ratio.

The meanings of the values of other intra-synapse integral output, integral result readout, synapse output signal, intra-neuron integral terminal, and neuron output pulse are the same as those in FIG. 6, and thus descriptions thereof will be omitted.

The temporal change in each of the values of the intra-synapse integral output, the integral result readout, the synapse output signal, the intra-neuron integral terminal, and the neuron output pulse differs from the temporal change shown in FIG. 6 because the excitatory pulse and the inhibitory pulse are input to the LIF neuron circuit 3 in the operation confirmation results shown in FIG. 7.

During a period in which the inhibitory pulse is input, the neuron output pulse is always low. Furthermore, during a period in which the pulse interval of the excitatory pulse is short, the pulse interval of the neuron output pulse is short. That is, as described above, in the LIF neuron circuit 3, the output frequency of the output pulse signal OP3 can be increased or decreased by the input pulse signal IP31 which is the excitatory pulse, or the input pulse signal IP32 which is the inhibitory pulse.

Figure 8:
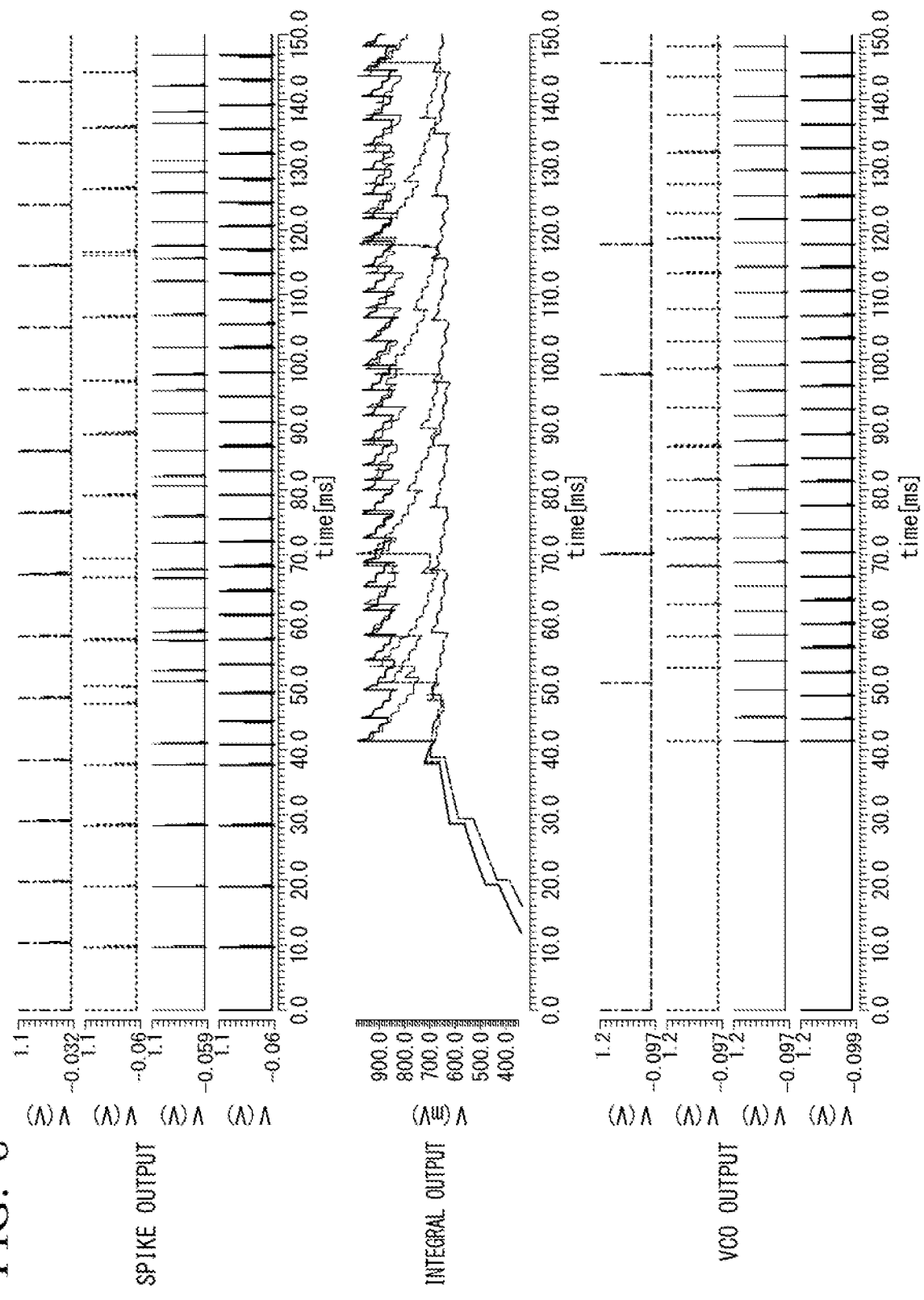
FIG. 8 is a diagram showing an example of an operation confirmation result of a spiking neural network according to the embodiment of the present invention.

Next, the operation confirmation result of the spiking NN configured of the module circuit 1, which is a LIF element, will be described. FIG. 8 is a diagram showing an example of the operation confirmation result of the spiking NN according to this embodiment. The spiking NN is configured of four module circuits 1, as an example. A plurality of graphs shown in FIG. 8 show the temporal change in each of values of a spike output, an integral output, and a voltage-controlled oscillator (VCO) output. The plurality of graphs shown in FIG. 8 show respective values of the spike output, the integral output, and the VCO output for each of the four module circuits 1.

The spike output indicates the value of the output pulse signal OP3 output from the output terminal OUT3 provided in the LIF neuron circuit 3.

The integral output indicates the value of the voltage V2 at the node (the connection point J21, the connection point J22, and the connection point J23) provided in the synapse element circuit 2. For each of the four module circuits 1, the four integral outputs are different from each other. By adjusting the four integral outputs, the four module circuits 1 can be operated as the spiking NN.

The VCO output indicates the value of the output pulse signal OP2 output from the output terminal OUT22 provided in the synapse element circuit 2.

Next, results of learning performed using the above-described spiking NN will be described.

Figure 9:
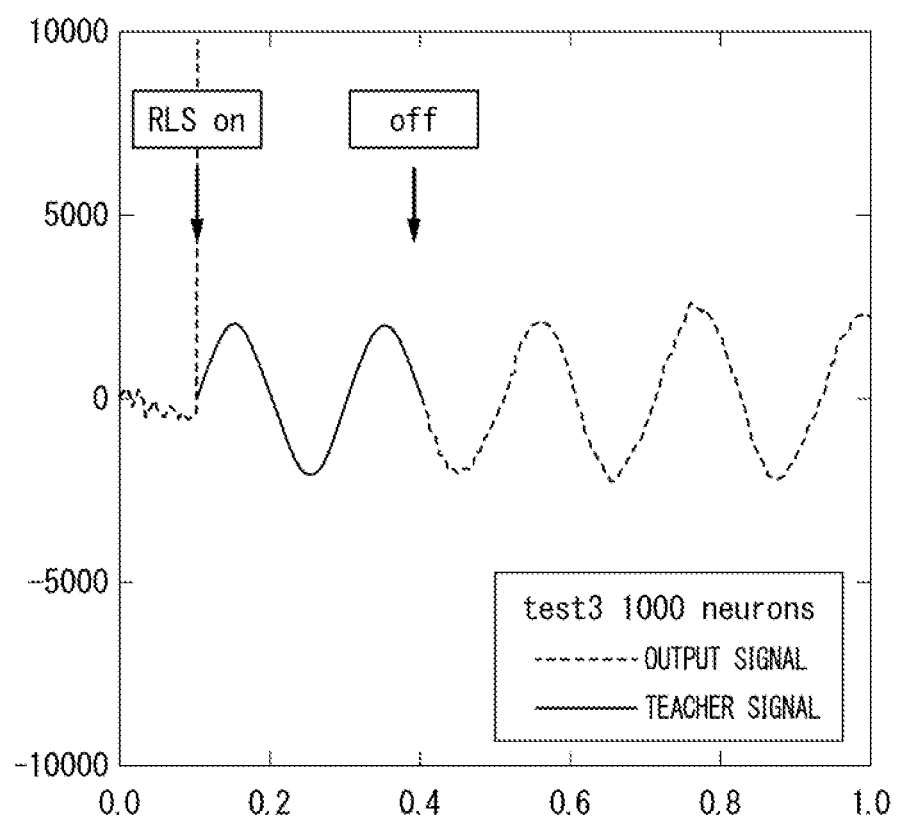
FIG. 9 is a diagram showing an example of temporal change in a synapse output signal according to the embodiment of the present invention.

FIG. 9 is a diagram showing an example of a temporal change in a synapse output signal according to this embodiment. The synapse output signal indicates the value of the output pulse signal OP2 output from the output terminal OUT21 provided in the synapse element circuit 2.

In FIG. 9, a teacher signal is shown along with the synapse output signal. The teacher signal is a signal for learning so that the value of the synapse output signal becomes close to a value of the teacher signal. The teacher signal is input during a period from the time shown as "RLS on" to the time shown as "off" in FIG. 9.

A graph of the synapse output signal almost overlaps a graph of the teacher signal during a period in which the teacher signal is input. The graph of the synapse output signal shows the same temporal change during a period after the input of the teacher signal (a period after a period indicated as "off") as in the period during in which the teacher signal is input. In other words, the graph of the synapse output signal changes over time in the same way as the graph of the teacher signal due to the teacher signal. In other words, it can be understood that learning can be realized by the spiking NN configured of the module circuit 1.

Figure 10:
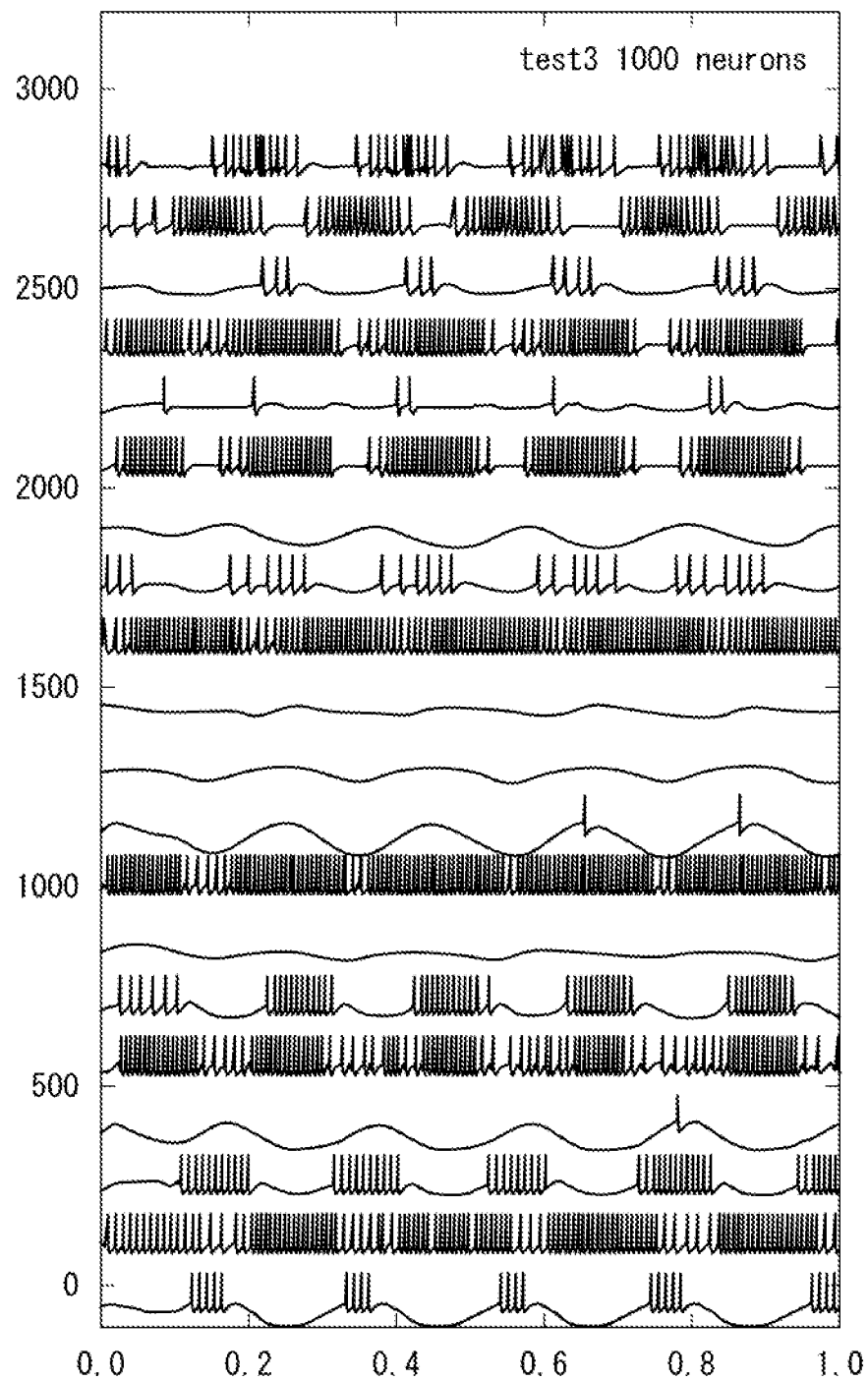
FIG. 10 is a diagram showing an example of temporal change in a neuron voltage according to the embodiment of the present invention.

FIG. 10 is a diagram showing an example of a temporal change in a neuron voltage according to this embodiment. The neuron voltage indicates a value of the voltage V3 of the node (the connection point J31, the connection point J32, and the connection point J33) provided in the LIF neuron circuit 3, similar to the above-described intra-neuron integral terminal (FIGS. 6 and 7).

Figure 11:
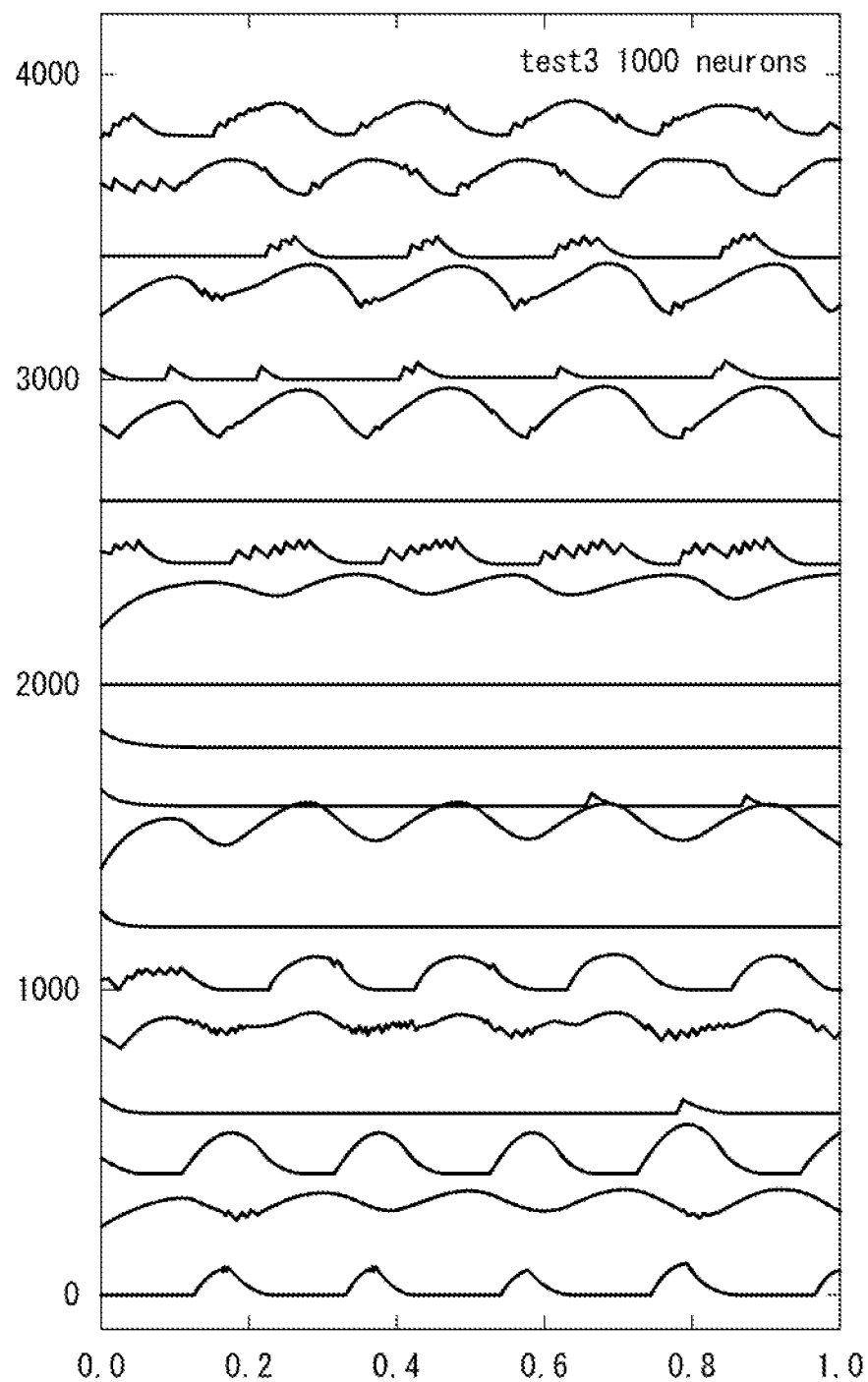
FIG. 11 is a diagram showing an example of temporal change in a synapse current according to the embodiment of the present invention.

FIG. 11 is a diagram showing an example of a temporal change in a synapse current according to this embodiment. The synapse current indicates a value of the voltage V2 at the node (the connection point J21, the connection point J22, and the connection point J23) provided in the synapse element circuit 2, similar to the above-described intra-synapse integral output (FIGS. 6 and 7).

As described above, the module circuit 1 according to this embodiment includes the first block circuit (the synapse element circuit 2 in this embodiment) and the second block circuit (the weight adjustment circuit 4 in this embodiment).

The first block circuit (the synapse element circuit 2 in this embodiment) includes the first input terminal (the input terminal IN21 in this embodiment), the holding unit (the capacitor C2 in this embodiment), the oscillation unit (the ring oscillator O2 in this embodiment), and the first output terminal (the output terminal OUT22 in this embodiment).

The input pulse signal IP1 is input to the first input terminal (the input terminal IN21 in this embodiment).

The holding unit (the capacitor C2 in this embodiment) holds an average value of the input pulse signal IP1 for a predetermined period according to the interval of the input pulse signal IP1 and the width of the input pulse signal IP1.

The oscillation unit (the ring oscillator O2 in this embodiment) generates the output pulse signal OP2 at a frequency according to the average value.

The first output terminal (the output terminal OUT22 in this embodiment) outputs the output pulse signal OP2.

The second block circuit (the weight adjustment circuit 4 in this embodiment) includes the second input terminal (the input terminal IN4 in this embodiment), the duty ratio adjuster (the inverter D41, the delay line D42, and the multiplexer M4 in this embodiment) and the second output terminal (the output terminal OUT4 in this embodiment).

The output pulse signal OP2 output from the first block circuit (the synapse element circuit 2 in this embodiment) is input to the second input terminal (the input terminal IN4 in this embodiment).

The duty ratio adjuster (the inverter D41, the delay line D42, and the multiplexer M4 in this embodiment) adjusts the duty ratio of the output pulse signal OP2.

The second output terminal (the output terminal OUT4 in this embodiment) outputs an output pulse signal (the output pulse signal OP4 in this embodiment) adjusted by the duty ratio adjuster (the inverter D41, the delay line D42, and the multiplexer M4 in this embodiment).

With this configuration, in the module circuit 1 according to this embodiment, since the output pulse signal can be output at a frequency according to time domain information such as the interval of the input pulse signal and the width of the pulse signal, the low power consumption can be achieved in the LIF element.

The module circuit 1 according to this embodiment relates to a low power consumption integrated circuit mounting method for neuron elements used in neural networks and the like. In the module circuit 1 according to this embodiment, low power, low heat generation, and high degree of integration are made possible by using so-called time domain information such as a cycle and a pulse width of a binary pulse signal of low and high, instead of using the voltage or current as information. The module circuit 1 according to this embodiment is operated mainly utilizing the leakage current flowing through the transistor in the OFF state, and thus can be operated with extremely low power consumption. The module circuit 1 according to this embodiment can be operated with low power consumption, does not require a large capacity, and can realize a time constant on a millisecond scale in a relatively small area.

Unlike conventional analog LIF elements, the module circuit 1 according to this embodiment adjusts a time for transitioning a binary voltage of 0 or 1 without precisely controlling analog quantities that are sensitive to noise or the like. Therefore, it is easy to implement even with low-voltage process technology, has high compatibility with advanced processes, and has an advantage of increasing the degree of integration.

EXAMPLE

Figure 12:
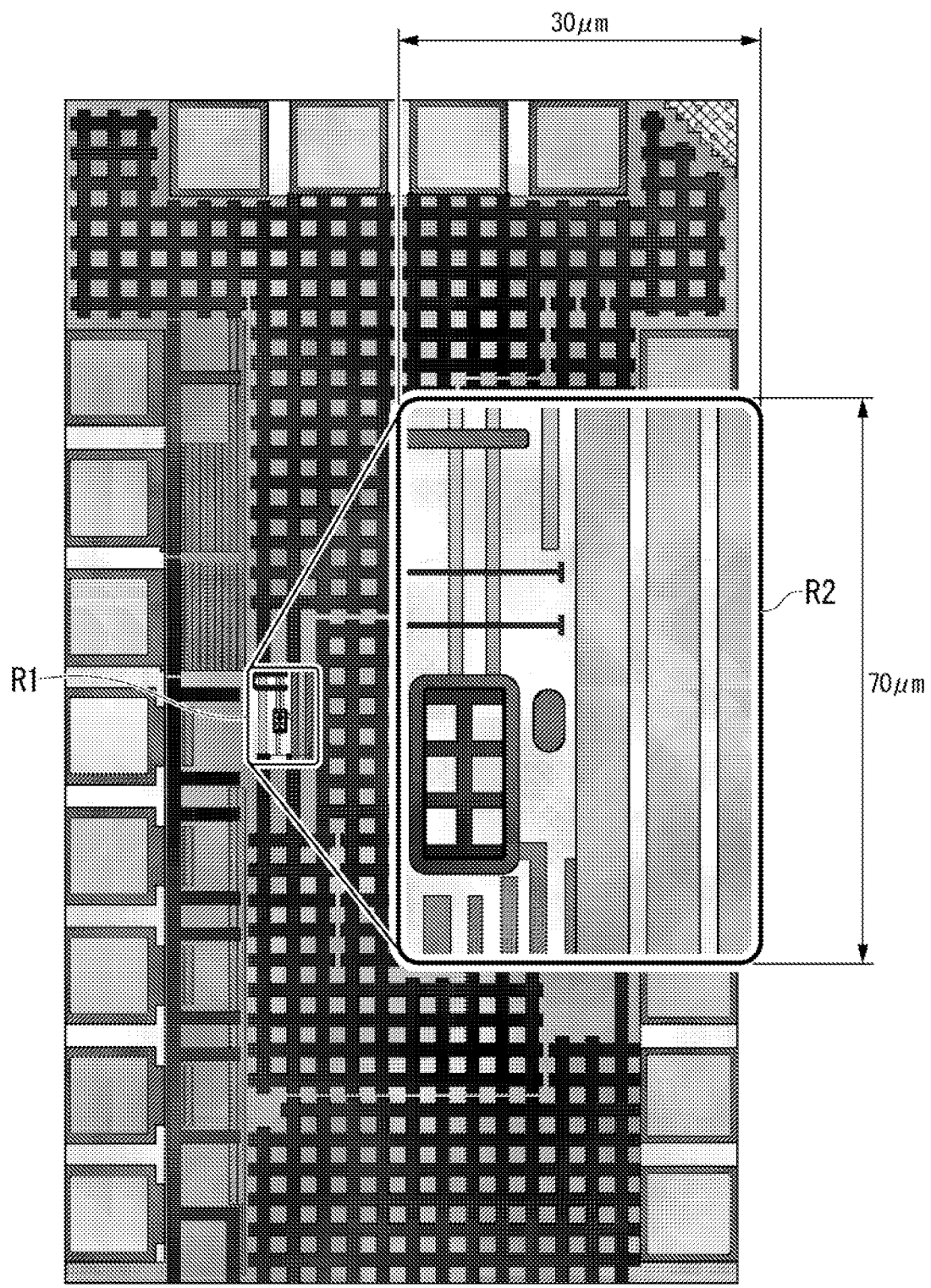
FIG. 12 is a diagram showing an appearance of a manufactured semiconductor chip according to the embodiment of the present invention.

Examples of the present invention will be described below. The module circuits used in the examples described below were fabricated as semiconductor chips as shown in FIG. 12. An enlarged region R2 is an enlarged region of a rectangular region R1 of the semiconductor chip. The enlarged region R2 has a long side length of 70 µm and a short side length of 30 µm. The area of the semiconductor chip of the LIF neuron circuit is 127 mm². The area of the semiconductor chip of the synapse element circuit is 231 mm². The area of the semiconductor chip of the weight adjustment circuit is 525 mm².

In the embodiment described below, a configuration of the synapse element circuit 20 is similar to the configuration of the synapse element circuit 2 (FIG. 2) according to the above-described embodiment. A configuration of the weight adjustment circuit 40 is similar to the configuration of the weight adjustment circuit 4 (FIG. 3) according to the above-described embodiment. A configuration of the LIF neuron circuit 30 is similar to the configuration of the LIF neuron circuit 3 (FIG. 4) according to the above-described embodiment. Therefore, in the examples described below, each of the reference numerals used in the above-described embodiment may be used for explanation.

First Example

In a first example, operation measurement results of an actually manufactured circuit when one weight adjustment circuit and one LIF neuron circuit are connected will be described.

Figure 13:
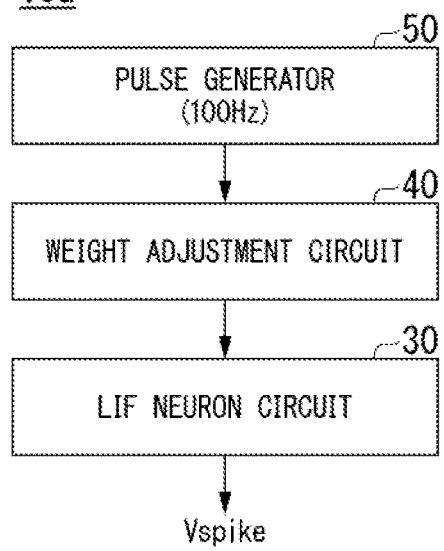
FIG. 13 is a diagram showing the configuration of a module circuit according to a first embodiment of the present invention.

FIG. 13 is a diagram showing an example of a configuration of a module circuit 10a according to this embodiment. The module circuit 10a includes a pulse generator 50, a weight adjustment circuit 40, and a LIF neuron circuit 30. The pulse generator 50, the weight adjustment circuit 40, and the LIF neuron circuit 30 are connected in series in this order and provided in the module circuit 10a.

The pulse generator 50 generates a 100 Hz rectangular wave as the input pulse signal IP4. The input pulse signal IP4 generated by the pulse generator 50 is input to the input terminal IN4 of the weight adjustment circuit 40. When the input pulse signal IP4 is input to the input terminal IN4, the output pulse signal OP4 is output from the output terminal OUT4 of the weight adjustment circuit 40. The output pulse signal OP4 output from the weight adjustment circuit 40 is input to the input terminal IN31 of the LIF neuron circuit 30. A spike signal $V_{spike}$ is output from the output terminal OUT3 of the LIF neuron circuit 30 as the output pulse signal OP3.

Figure 14:
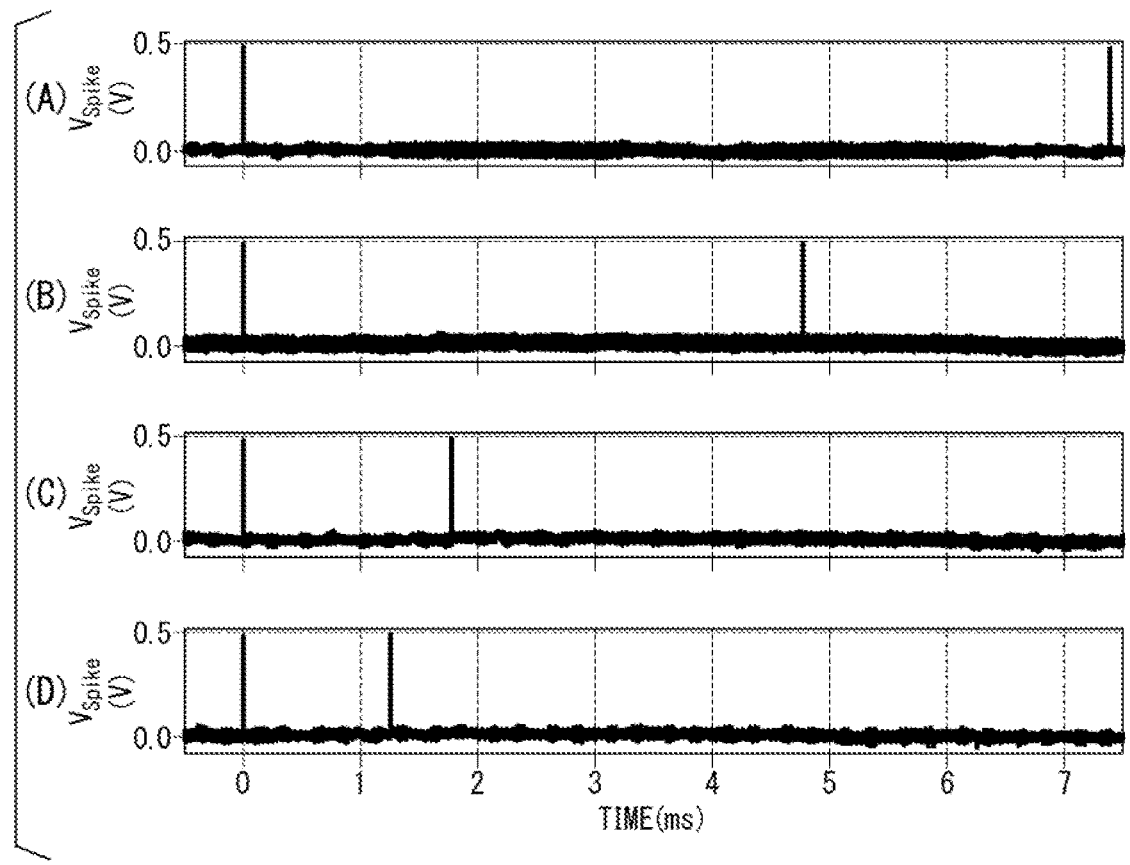
FIG. 14 is a diagram showing an operation measurement result of the module circuit according to the first embodiment of the present invention.

FIG. 14 shows a waveform of the spike signal $V_{spike}$ output from the module circuit 10a as the operation measurement result of the module circuit 10a. Each of FIGS. 14(A), FIG. 14(B), FIG. 14(C), and FIG. 14(D) shows a waveform of the spike signal $V_{spike}$ when weight values for adjusting the pulse width of the output pulse signal OP4 by the weight adjustment circuit 40 are 1, 2, 4, and 8. As shown in FIG. 14, it was confirmed that as the weight becomes large, a spike cycle of the spike signal $V_{spike}$ becomes short.

Second Example

In a second example, operation measurement results of an actually manufactured circuit will be described when two weight adjustment circuits are connected to two input terminals of one LIF neuron circuit.

Figure 15:
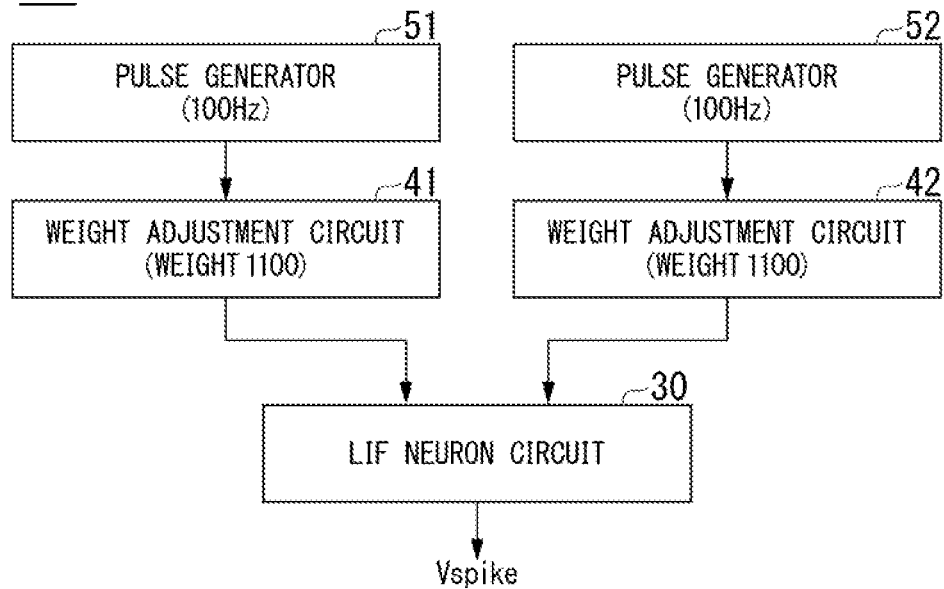
FIG. 15 is a diagram showing the configuration of a module circuit according to a second embodiment of the present invention.

FIG. 15 is a diagram showing an example of a configuration of the module circuit 10b according to this embodiment. The module circuit 10b includes a pulse generator 51, a pulse generator 52, a weight adjustment circuit 41, a weight adjustment circuit 42, and a LIF neuron circuit 30. The pulse generator 51 and the weight adjustment circuit 41 are connected in series in this order. The pulse generator 52 and the weight adjustment circuit 42 are connected in series in this order. The pulse generator 51 and the weight adjustment circuit 41 connected in series, and the pulse generator 52 and the weight adjustment circuit 42 connected in series are connected in parallel to the LIF neuron circuit 30.

A configuration of each of the weight adjustment circuit 41 and the weight adjustment circuit 42 are similar to the configuration of the weight adjustment circuit 40. A configuration of each of the pulse generator 51 and the pulse generator 52 is similar to the configuration of the pulse generator 50. The input pulse signal IP4 which is a 100 Hz rectangular wave generated by the pulse generator 51 is input to the input terminal IN4 of the weight adjustment circuit 41, and output from the output terminal OUT4 of the weight adjustment circuit 41 as the output pulse signal OP4. Similarly, the input pulse signal IP4 which is a 100 Hz rectangular wave generated by the pulse generator 52 is input to the input terminal IN4 of the weight adjustment circuit 42, and output from the output terminal OUT4 of the weight adjustment circuit 42 as the output pulse signal OP4.

The output pulse signal OP4 output from the weight adjustment circuit 41 is input to the input terminal IN31 of the LIF neuron circuit 30 as the input pulse signal IP31 which is the excitatory pulse. On the other hand, the output pulse signal OP4 output from the weight adjustment circuit 42 is input to the input terminal IN32 of the LIF neuron circuit 30 as the input pulse signal IP32 which is the inhibitory pulse. A spike signal $V_{spike}$ is output from the output terminal OUT3 of the LIF neuron circuit 30 as the output pulse signal OP3.

Figure 16:
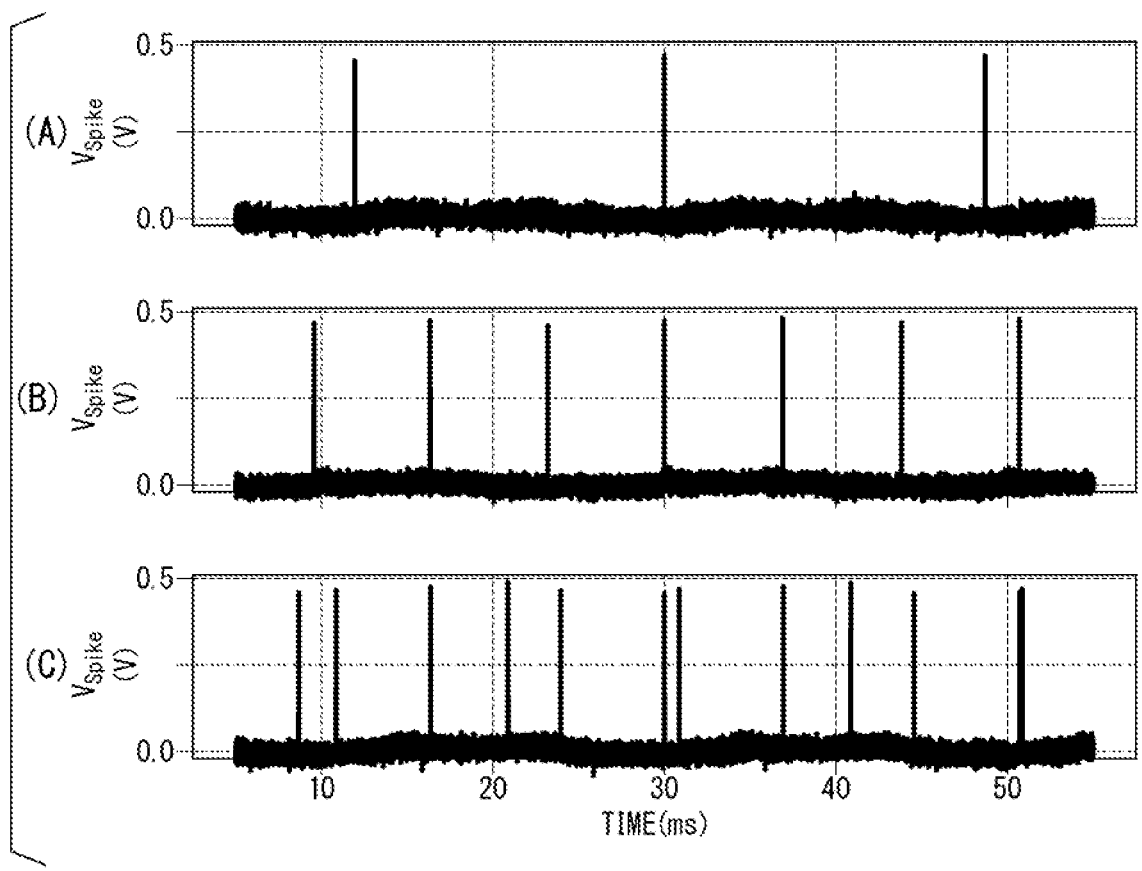
FIG. 16 is a diagram showing an operation measurement result of the module circuit according to the second embodiment of the present invention.

FIG. 16 shows a waveform of the spike signal $V_{spike}$ output from the module circuit 10b as the operation measurement result of the module circuit 10b. FIG. 16(A) shows the waveform of the spike signal $V_{spike}$ when no signal is input to the input terminal IN31 and the inhibitory pulse (the input pulse signal IP32) is input to the input terminal IN32. FIG. 16(B) shows the waveform of the spike signal $V_{spike}$ when no signal is input to either the input terminal IN31 or the input terminal IN32. FIG. 16(C) shows the waveform of the spike signal $V_{spike}$ when the excitatory pulse (the input pulse signal IP31) is input to the input terminal IN31 and no signal is input to the input terminal IN32. As shown in FIG. 16(B), the LIF neuron circuit 30 periodically outputs the spike signal $V_{spike}$ to the output terminal OUT3 even when no signal is input. As shown in FIG. 16A, when the inhibitory pulse is input from the input terminal IN32, the cycle of the spike signal $V_{spike}$ becomes longer. On the other hand, as shown in FIG. 16C, when the excitatory pulse is input from the input terminal IN31, the cycle of the spike signal $V_{spike}$ becomes shorter.

Third Example

In a third example, operation measurement results of an actually manufactured circuit when the module circuit according to the second example is connected to a synapse circuit will be described.

Figure 17:
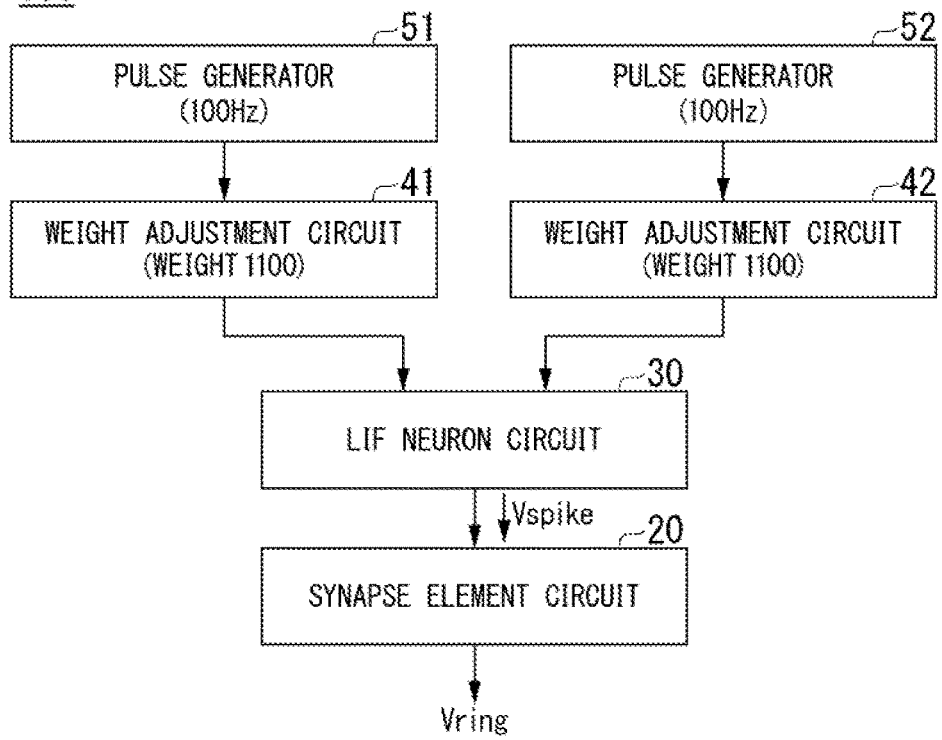
FIG. 17 is a diagram showing the configuration of a module circuit according to a third embodiment of the present invention.

FIG. 17 is a diagram showing an example of a configuration of the module circuit 10c according to this embodiment. Comparing the configuration of the module circuit 10c and the configuration of the module circuit 10b (FIG. 15) according to the second embodiment, the synapse element circuit 20 is different. In the module circuit 10c, the LIF neuron circuit 30 and the synapse element circuit 20 are connected in series.

The spike signal $V_{spike}$ output from the output terminal OUT3 of the LIF neuron circuit 30 is input to the input terminal IN22 of the synapse element circuit 20. From the output terminal OUT22 of the synapse element circuit 20, a pulse signal $V_{ring}$ generated by the ring oscillator O2 is output as the output pulse signal OP2.

Figure 18:
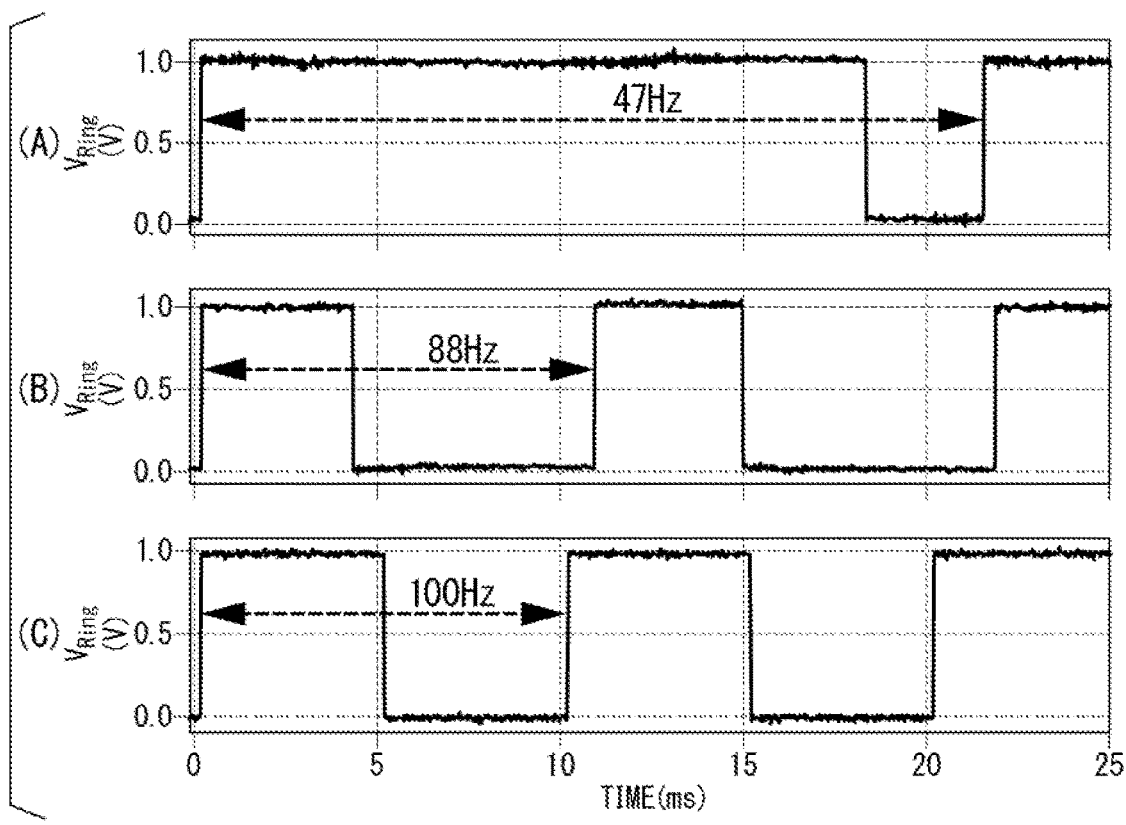
FIG. 18 is a diagram showing an operational measurement result of the module circuit according to the third embodiment of the present invention.

FIG. 18 shows the waveform of the pulse signal $V_{ring}$ output from the module circuit 10c as the operation measurement result of the module circuit 10c. FIG. 18(A) shows a waveform of the pulse signal $V_{ring}$ when no signal is input to the input terminal IN31 and the inhibitory pulse (the input pulse signal IP32) is input to the input terminal IN32. FIG. 16(B) shows the waveform of the pulse signal $V_{ring}$ when no signal is input to either the input terminal IN31 or the input terminal IN32. FIG. 16(C) shows the waveform of the pulse signal $V_{ring}$ when the excitatory pulse (the input pulse signal IP31) is input to the input terminal IN31 and no signal is input to the input terminal IN32. As shown in FIG. 18(B), the synapse element circuit 20 periodically outputs a rectangular wave as the pulse signal $V_{ring}$ according to the spike signal $V_{spike}$ output from the LIF neuron circuit 30. As shown in FIG. 18(A), when the inhibitory pulse is input from the input terminal IN32, the frequency of the rectangular wave becomes small. On the other hand, as shown in FIG. 18(C), when the excitatory pulse is input from the input terminal IN31, the frequency of the rectangular wave increases.

Fourth Example

In the fourth example, operation measurement results of an actually manufactured circuit when one weight adjustment circuit and one synapse circuit are connected will be described.

Figure 19:
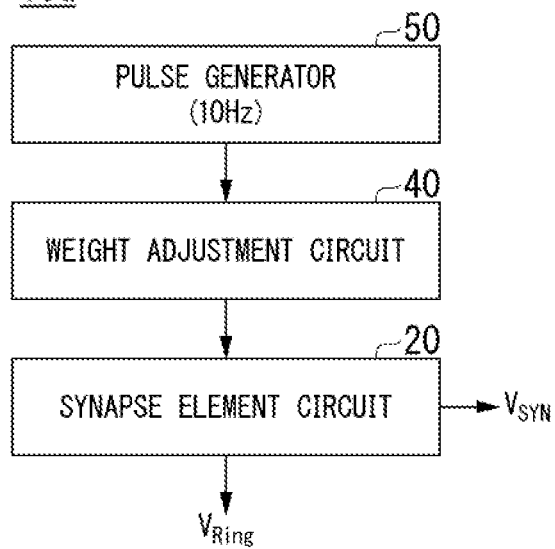
FIG. 19 is a diagram showing the configuration of a module circuit according to a fourth embodiment of the present invention.

FIG. 19 is a diagram showing an example of a configuration of the module circuit 10d according to this embodiment. The module circuit 10d includes a pulse generator 50, a weight adjustment circuit 40, and a synapse element circuit 20. The pulse generator 50, the weight adjustment circuit 40, and the synapse element circuit 20 are connected in series in this order and provided in the module circuit 10d.

The pulse generator 50 generates a 10 Hz rectangular wave as the input pulse signal IP4. The input pulse signal IP4 generated by the pulse generator 50 is input to the input terminal IN4 of the weight adjustment circuit 40. When the input pulse signal IP4 is input to the input terminal IN4, the output pulse signal OP4 is output from the output terminal OUT4 of the weight adjustment circuit 40. The output pulse signal OP4 output from the weight adjustment circuit 40 is input to the input terminal IN22 of the synapse element circuit 20. A synapse potential signal $V_{SYN}$ is output as a signal (integration result readout) from the output terminal OUT21 of the synapse element circuit 20. On the other hand, the pulse signal $V_{ring}$ is output from the output terminal OUT22 of the synapse element circuit 20.

Figure 20:
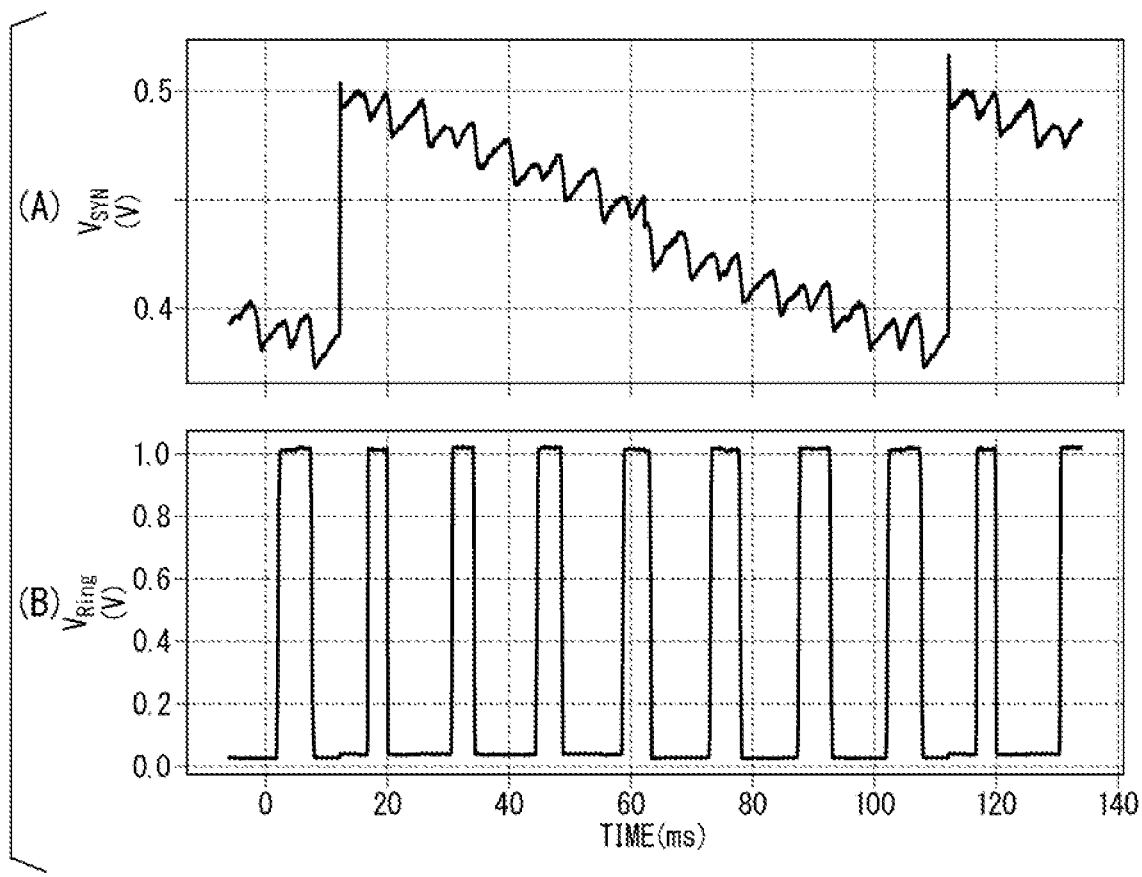
FIG. 20 is a diagram showing an operational measurement result of the module circuit according to the fourth example of the present invention.

FIG. 20 shows the waveform of the synapse potential signal $V_{SYN}$ and the waveform of the pulse signal $V_{ring}$ Output from the module circuit 10d as the operation measurement results of the module circuit 10d. FIG. 20(A) shows the waveform of the synapse potential signal $V_{SYN}$. FIG. 20(B) shows the waveform of the pulse signal $V_{ring}$. As shown in FIG. 20(A), in the module circuit 10d, when there is an input to the input terminal IN22, the synapse potential signal $V_{SYN}$ momentarily increases, and then the synapse potential signal $V_{SYN}$ slowly decreases. On the other hand, as shown in FIG. 20(B), the pulse signal $V_{ring}$ is output as a rectangular wave of which a frequency is modulated according to the voltage of the synapse potential signal $V_{SYN}$. When the synapse potential signal $V_{SYN}$ increases according to the input to the input terminal IN22, the frequency of the pulse signal $V_{ring}$ increases. When there is no input to the input terminal IN22, the synapse potential signal $V_{SYN}$ decreases, and the frequency of the pulse signal $V_{ring}$ decreases.

Although one embodiment of the present invention has been described above in detail with reference to the drawings, the specific configuration is not limited to that described above, and various design changes can be made without departing from the gist of the invention.

REFERENCE SIGNS LIST

1 Module circuit
2 Synapse element circuit
4 Weight adjustment circuit
IN2 Input terminal
C2 Capacitor
O2 Ring oscillator OUT22 Output terminal
IN4 Input terminal
D41 Inverter
D42 Delay line
M4 Multiplexer
OUT4 Output terminal
IP1 Input pulse signal
OP2, OP4 Output pulse signal

What is claimed is:

1. A module circuit comprising:
a first block circuit; and
a second block circuit,
wherein the first block circuit includes a first input terminal into which an input pulse signal is input, a holding unit that holds an average value of the input pulse signal for a predetermined period according to an interval of the input pulse signal and a width of the input pulse signal, an oscillation unit that generates an output pulse signal at a frequency according to the average value, and a first output terminal that outputs the output pulse signal,
the second block circuit includes a second input terminal to which the output pulse signal output from the first block circuit is input, a duty ratio adjuster that adjusts the duty ratio of the output pulse signal, and a second output terminal that outputs the output pulse signal adjusted by the duty ratio adjuster,
in the first block circuit, the holding unit includes a capacitor, integrates a pulse voltage indicating the input pulse signal, and holds a result of integrating the pulse voltage as the average value,
the oscillation unit is supplied with an integrated current, which is obtained by integrating the pulse voltage with the holding unit and increases monotonically with respect to the result of integrating the pulse voltage, from the holding unit, and generates the output pulse signal with a frequency that depends on a magnitude of the integrated current, and
a high side switching element that forms the pulse voltage charged to the capacitor by opening and closing according to the input pulse signal indicating an excitatory input is further included.

2. The module circuit according to claim 1, wherein the first block circuit further includes a low side switching element that discharges charge of the capacitor by opening and closing according to the input pulse signal indicating an inhibitory input.

3. The module circuit according to claim 1, wherein the first block circuit further includes an inflow limiter that limits inflow of the integrated current from the holding unit to the oscillation unit.

4. The module circuit according to claim 1, further comprising a third block circuit,
wherein the third block circuit includes a third input terminal to which the output pulse signal output from the second block circuit is input, a charging unit charged by a leakage current of a MOS transistor, a pulse signal generation unit that generates a pulse signal and resets an amount of charging of the charging unit when the amount of charging of the charging unit exceeds a threshold value, and a third output terminal that outputs the pulse signal generated by the pulse signal generation unit, and
a frequency with which the pulse signal generation unit generates the output pulse signal increases or decreases according to a frequency with which the output pulse signal is input to the third input terminal.

5. The module circuit according to claim 4, wherein the third block circuit includes: a CMOS inverter including a P-type MOS transistor and an N-type MOS transistor connected in series between a power supply terminal and a ground terminal;
a reverser that generates an inverted signal by inverting the output from the CMOS inverter;
a switching element that is disposed between the P-type MOS transistor and the N-type MOS transistor and opens and closes according to the inverted signal;
a delay circuit that delays an output from the CMOS inverter and inputs the delayed output to the CMOS inverter again;
a second capacitor charged by a pulse voltage indicating the output pulse signal input to the third input terminal; and
at least one of a second low side switching element that discharges charge of the second capacitor in a closed state by opening and closing according to a second input pulse signal indicating an of inhibitory input, and a second high side switching element that generates a pulse voltage indicating a first input pulse signal by opening and closing according to a first input pulse signal indicating an excitatory input,
the charging unit includes the second capacitor,
the pulse signal generation unit includes the reverser, the switching element, and the delay circuit, and
a voltage of the second capacitor is input to the CMOS inverter.

6. A reservoir circuit comprising a plurality of module circuits according to claim 1.

7. The reservoir circuit according to claim 6, wherein the second output terminal provided in each of the one or more module circuits and the first input terminal provided in one module circuit are connected, or the second output terminal provided in one module circuit and the first input terminal provided in each of the plurality of module circuits are connected.

* * * * *